United States Patent
Li et al.

(10) Patent No.: US 12,205,386 B2
(45) Date of Patent: Jan. 21, 2025

(54) CELL LINE DEVELOPMENT IMAGE CHARACTERIZATION WITH CONVOLUTIONAL NEURAL NETWORKS

(71) Applicant: Genentech, Inc., South San Francisco, CA (US)

(72) Inventors: Zheng Li, South San Francisco, CA (US); Mandy Man Chu Yim, San Mateo, CA (US); Bibi Ephraim, Oakland, CA (US); Dat Tran, San Mateo, CA (US); Xinyu Liu, Pleasanton, CA (US); David Shaw, San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 419 days.

(21) Appl. No.: 17/841,610

(22) Filed: Jun. 15, 2022

(65) Prior Publication Data

US 2022/0309666 A1    Sep. 29, 2022

Related U.S. Application Data

(63) Continuation of application No. PCT/US2020/065865, filed on Dec. 18, 2020.
(Continued)

(51) Int. Cl.
*G06V 20/69* (2022.01)
*G06T 7/00* (2017.01)
(Continued)

(52) U.S. Cl.
CPC .......... *G06V 20/698* (2022.01); *G06T 7/0012* (2013.01); *G06T 7/11* (2017.01);
(Continued)

(58) Field of Classification Search
CPC .... G06V 20/698; G06V 10/25; G06V 10/454; G06V 10/82; G06T 7/0012; G06T 7/11;
(Continued)

(56) References Cited

U.S. PATENT DOCUMENTS 10,586,327 B2    3/2020  Chang et al.
2015/0087240 A1  3/2015  Loewke et al.
(Continued)

FOREIGN PATENT DOCUMENTS

WO    2018213709 A1    11/2018
WO    2019178561 A2    9/2019

OTHER PUBLICATIONS

International Preliminary Report on Patentability, issued May 17, 2022, for PCT Application No. PCT/US2020/065865, filed Dec. 18, 2020, 15 pages.
International Search Report and Written Opinion, mailed Apr. 16, 2021, for PCT Application No. PCT/US2020/065865, filed Dec. 18, 2020, 18 pages.
(Continued)

Primary Examiner — Christopher Wait
(74) Attorney, Agent, or Firm — MORRISON & FOERSTER LLP

(57) ABSTRACT

A method includes, by a computing system, receiving a querying image depicting a sampling area, processing the querying image using a single cluster detection model to identify one or more regions of the querying image depicting a cluster in the sampling area, processing the one or more regions using a cluster verification deep-learning model to determine whether each depicted cluster is a cell cluster, and determining that exactly one of the identified one or more regions depicts a cluster that is a cell cluster. The method further includes processing the region depicting the cell cluster using a morphology deep-learning model to determine that there is only one cell in the cell cluster and to determine that die morphology of the cell is acceptable.

22 Claims, 25 Drawing Sheets

Related U.S. Application Data

(60) Provisional application No. 62/951,998, filed on Dec. 20, 2019.

(51) Int. Cl.

| | | |
|---|---|---|
| *G06T 7/11* | (2017.01) | |
| *G06T 7/73* | (2017.01) | |
| *G06V 10/25* | (2022.01) | |
| *G06V 10/44* | (2022.01) | |
| *G06V 10/82* | (2022.01) | |

(52) U.S. Cl.
CPC ............. *G06T 7/73* (2017.01); *G06V 10/25* (2022.01); *G06V 10/454* (2022.01); *G06V 10/82* (2022.01); *G06T 2207/10064* (2013.01); *G06T 2207/30024* (2013.01)

(58) Field of Classification Search
CPC ............. G06T 7/73; G06T 2207/10064; G06T 2207/30024; G06F 18/24133
See application file for complete search history.

(56) References Cited

U.S. PATENT DOCUMENTS

| | | |
|---|---|---|
| 2016/0239957 A1 | 8/2016 | Akai |
| 2018/0232879 A1* | 8/2018 | Chang ................. G06T 5/75 |
| 2020/0257886 A1 | 8/2020 | Fujimoto |

OTHER PUBLICATIONS

Ren, S. et al. (Jun. 1, 2017). "Faster R-CNN: Towards Real-Time Object Detection with Region Proposal Networks," IEEE Transaction on Pattern Analysis and Machine Intelligence 39(6):1137-1149.

* cited by examiner

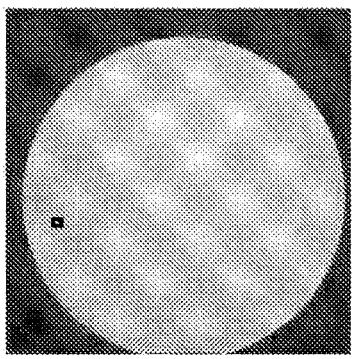

Max distance to next point in well contour = 485
Distance - Radius = -28
Big clipping and correct prediction

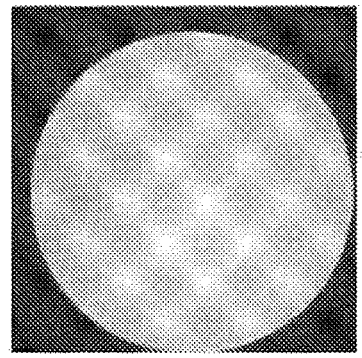

Max distance to next point in well contour = 172
Distance - Radius = -6
Small clipping and correct prediction

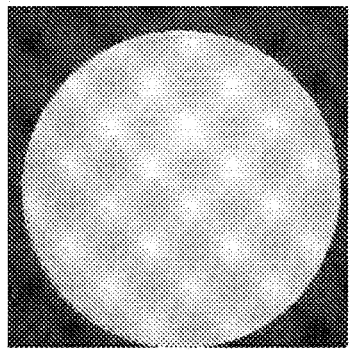

Max distance to next point in well contour = 67
Distance - Radius = -4
Small clipping and correct prediction

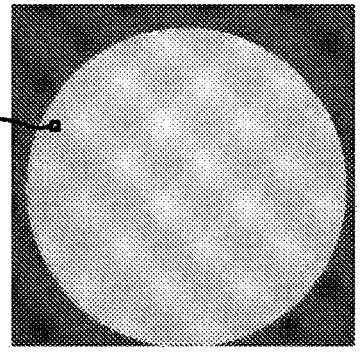

Max distance to next point in well contour = 98
Distance - Radius = -1
Small clipping and correct prediction

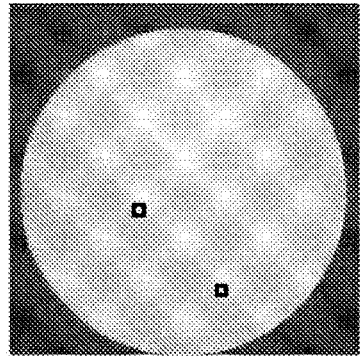

Max distance to next point in well contour = 156
Distance - Radius = 2
Tiny clipping and correct prediction

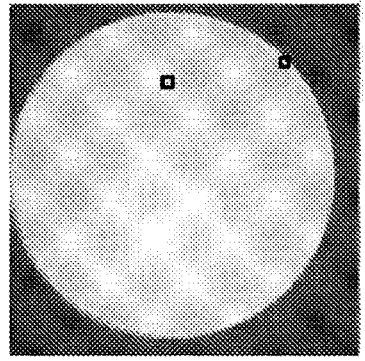

Max distance to next point in well contour = 68
Distance - Radius = -3
No clipping but incorrect prediction

*FIG. 9*

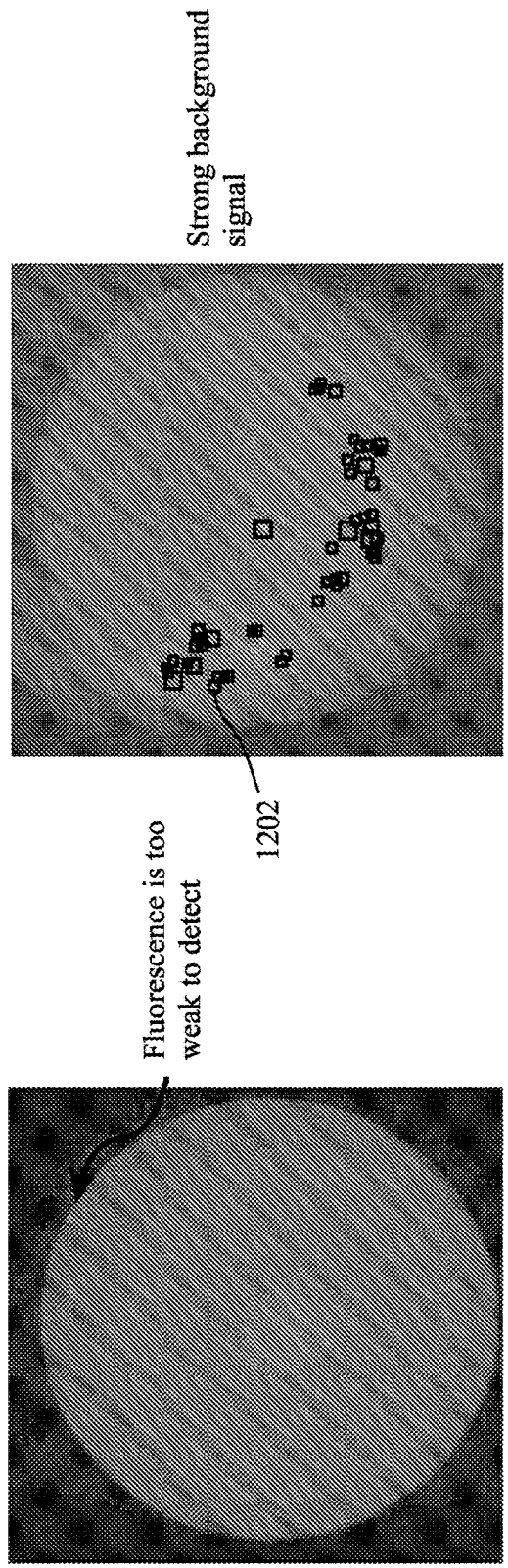
FIG. 12B
FIG. 12A
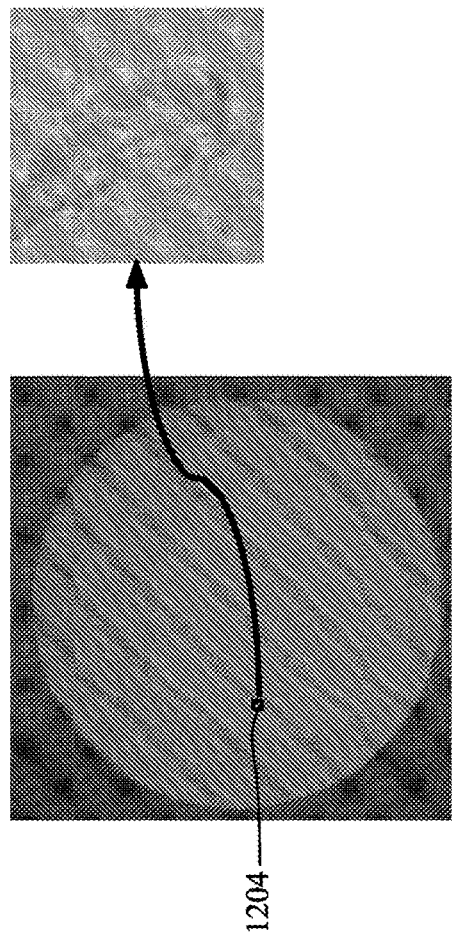
FIG. 12C

CELL LINE DEVELOPMENT IMAGE CHARACTERIZATION WITH CONVOLUTIONAL NEURAL NETWORKS

CROSS REFERENCE TO RELATED APPLICATIONS

This application is a continuation of International Application No. PCT/US2020/065865, filed on Dec. 18, 2020, which claims the benefit of and the priority to U.S. Provisional Application No. 62/951,998, filed on Dec. 20, 2019.

FIELD OF THE INVENTION

The present disclosure relates to methods of cell line development (CLD) image characterization using machine-learning algorithms, such as convolutional neural networks, to analyze and classify images.

BACKGROUND

The field of biological therapeutics, also known as biologics or biopharmaceuticals, has been rapidly growing within the biotechnology industry. The majority of biologics are protein-based therapeutics, of which recombinant proteins are the largest group with over 400 recombinant products approved worldwide. In the development of biopharmaceutical products, recombinant proteins are to be produced from a monoclonal cell line. Regulatory agencies require reasonable assurance that the production cell line has originated from a single progenitor cell. Existing guidance calls for documentation of the cloning procedure with details of the imaging techniques and/or appropriate statistics demonstrating that a cell line used for the generation of a biologic is clonally-derived. There are several known methods of cloning used to generate a clinical cell line, particularly a mammalian cell line, including limiting dilution cloning, single-cell printing, and fluorescence-activated cell sorting. These methods use different techniques for depositing a single cell into the wells of a multi-well plate, and each have their own advantages and disadvantages in terms of ease of use, implementation cost, and seeding and cloning efficiency. While the intention for each cloning method is single cell deposition, this does not always occur. Upon seeding, a plate well may contain a single cell, multiple cells, or no cell at all. As such, the methods may be followed by plate imaging to confirm that only one cell is in fact present in each plate well. The images of the cell culture plate immediately after plating may provide as the only direct evidence of the cloning event and are often provided with submissions to the United States Food and Drug Administration for such purpose. They are also used to determine which cells should be taken forward as having a high assurance of being clonally-derived. As such, these images play an important role and are heavily relied on in cell line development. However, there are number of challenges in the image analysis process itself, which may affect the consistency of the results as well as overall efficiency of single-cell cloning.

SUMMARY OF PARTICULAR EMBODIMENTS

Herein is provided a method for cell line development image characterization using machine learning to achieve automatic single-cell image review.

Clinical cell lines may be created for the development of recombinant protein-based pharmaceutical products, such as monoclonal antibodies (mAb). Disclosed herein is an accurate and precise automated imaging workflow to document single-cell cloning during cell line development. Image characterization is used to describe the procedures of classifying images from a cell line development study into different categories to achieve image review. In particular embodiments, a cell line development image characterization method disclosed herein may improve defect detection in images by using machine-learning algorithms. The image characterization method may use artificial neural networks to train the machine-learning models which may classify images of cells. The image characterization method may use transfer learning to reduce the number of samples required in the training of the machine-learning models. In this description, an example cell line development image characterization method is discussed that evaluates Chinese hamster ovary (CHO) cells, however in practice, an implementation of an image characterization method is applicable to any mammalian cells. The method may acquire images of cells to be reviewed, classify the images of cells using the machine-learning models, and return images with unsure defects for manual inspection while passing through good images of cells.

The method of CLD image characterization described herein combines digital image processing techniques like transformations and filtering, and pattern recognition techniques like machine learning and deep learning. The method involves multiple steps that may be practiced on their own or together, in successive order or in alternative orders. The process filters out bad images at each step until a selected set of good images having a high assurance that their respective wells contain a single cell is obtained. The method of CLD image characterization is intended to replace a first round of manual image analysis performed by researchers. Implementing the automated cell image analysis utilizing the methods disclosed herein improves consistency of the results and increases throughput of single-cell image analysis.

Certain technical challenges exist for achieving the goal of applying machine-learning algorithms to image characterization of clinical cell lines. One technical challenge includes achieving very high accuracy because not catching bad images may reduce the assurance that the cell line used for the generation of a biologic is clonally-derived. Another technical challenge is ensuring that good images are accurately identified because classifying a good image as a bad image can lead to a high number of clones being unnecessarily rejected and an inefficient workflow. Image analysis software associated with their respective imagers to identify cells within the wells are commercially available. However, despite setting exacting parameters, the results of the algorithms are not always reliable. The solutions presented by the embodiments disclosed herein to address the above challenges include using one or more particular architectures of the machine-learning algorithms, which results in high classification accuracy of both good and bad images. Although this disclosure describes characterizing CLD images via particular systems in particular manners, this disclosure contemplates characterizing any suitable image via any suitable system in any suitable manner.

One aspect of the disclosure includes a method comprising, by a computing system, receiving a querying image depicting a sampling area, processing the querying image using a single cluster detection model to identify one or more regions of the querying image depicting a cluster in the sampling area, processing the one or more regions using a cluster verification deep-learning model to determine whether each depicted cluster is a cell cluster, determining that exactly one of the identified one or more regions depicts a cluster that is a cell cluster, and processing the region depicting the cell cluster using a morphology deep-learning model to determine that there is only one cell in the cell cluster, and determine that the morphology of the cell is acceptable. Each depicted cluster comprises a cluster contour region having a cluster contour region size within a predefined range and at least a predefined number of points. Identifying the region comprises drawing a bounding box around the cluster contour region. Determining whether each depicted cluster is a cell cluster comprises verifying each depicted cluster in a corresponding position of another querying image depicting the sampling area. Determining whether each depicted cluster is a cell cluster comprises determining whether each depicted cluster appears as a cluster positive for having a cell. Determining whether each depicted cluster is a cell cluster comprises determining whether each depicted cluster does not appear as a cluster negative for having a cell. Determining that there is only one cell in the cell cluster comprises evaluating the number of contours detected in the cell cluster. Determining that the morphology of the cell is acceptable comprises identifying a cell center area and evaluating the cell center area for roundness. Determining that the morphology of the cell is acceptable comprises identifying a bright cell center area and a dark ring-shape cell membrane around the bright cell center area. Determining that the morphology of the cell is acceptable comprises identifying a bright cell center area and a bright ring-shape area outside of the cell membrane. The querying image comprises a fluorescence image or a bright-field image. The method further comprising, prior to processing the querying image, identifying one or more large distinct objects in the querying image using contour detection algorithms during a pre-check stage of analysis. The method further comprising, prior to processing the querying image, determining whether the querying image is below a predetermined darkness threshold during a pre-check stage of analysis. The method further comprising, prior to processing the querying image, determining whether a critical clipping of the sampling area exists in the querying image. The sampling area is a well, the well having a well contour in the querying image defined by a plurality of well contour points and a well contour center. Determining whether a critical clipping of the sampling area exists comprises applying a fitting circle having a fitting circle center and a fitting circle radius to the well contour in the querying image. Determining whether a critical clipping of the sampling area exists further comprises calculating a fitting circle radius minus a distance of the fitting circle center to each of the plurality of well contour points to identify differences between the well contour and the fitting circle. Determining whether a critical clipping of the sampling area exists comprises calculating a distance from the well contour center to an image edge minus a well contour radius to determine whether the result is less than or equal to a predefined distance threshold. Determining whether a critical clipping of the sampling area exists comprises determining whether consecutive well contour points lie in a single line and whether the distance between two end points of the single line meets or exceeds a predefined distance threshold. Determining whether a critical clipping of the sampling area exists further comprises determining whether the single line has a local curvature of zero.

One aspect of the disclosure includes a system comprising one or more processors and a non-transitory memory coupled to the processors comprising instructions executable by the processors, the processors operable when executing the instructions to receive a querying image depicting a sampling area, process the querying image using a single cluster detection model to identify one or more regions of the querying image depicting a cluster in the sampling area, process the one or more regions using a cluster verification deep-learning model to determine whether each depicted cluster is a cell cluster, determine that exactly one of the identified one or more regions depicts a cluster that is a cell cluster, and process the region depicting the cell cluster using a morphology deep-learning model to determine that there is only one cell in the cell cluster, and determine that the morphology of the cell is acceptable. Each depicted cluster comprises a cluster contour region having a cluster contour region size within a predefined range and at least a predefined number of points. Identifying the region comprises drawing a bounding box around the cluster contour region. Determining whether each depicted cluster is a cell cluster comprises verifying each depicted cluster in a corresponding position of another querying image depicting the sampling area. Determining whether each depicted cluster is a cell cluster comprises determining whether each depicted cluster appears as a cluster positive for having a cell. Determining whether each depicted cluster is a cell cluster comprises determining whether each depicted cluster does not appear as a cluster negative for having a cell. Determining that there is only one cell in the cell cluster comprises evaluating the number of contours detected in the cell cluster. Determining that the morphology of the cell is acceptable comprises identifying a cell center area and evaluating the cell center area for roundness. Determining that the morphology of the cell is acceptable comprises identifying a bright cell center area and a dark ring-shape cell membrane around the bright cell center area. Determining that the morphology of the cell is acceptable comprises identifying a bright cell center area and a bright ring-shape area outside of the cell membrane. The querying image comprises a fluorescence image or a bright-field image. The processors are further operable when executing the instructions to, prior to processing the querying image, identify one or more large distinct objects in the querying image using contour detection algorithms during a pre-check stage of analysis. The processors are further operable when executing the instructions to, prior to processing the querying image, determine whether the querying image is below a predetermined darkness threshold during a pre-check stage of analysis. The processors are further operable when executing the instructions to, prior to processing the querying image, determine whether a critical clipping of the sampling area exists in the querying image. The sampling area is a well, the well having a well contour in the querying image defined by a plurality of well contour points and a well contour center. The processors are operable when executing the instructions to determine whether a critical clipping of the sampling area exists by applying a fitting circle having a fitting circle center and a fitting circle radius to the well contour in the querying image. The processors are operable when executing the instructions to determine whether a critical clipping of the sampling area exists further by calculating a fitting circle radius minus a distance of the fitting circle center to each of the plurality of well contour points to identify differences between the well contour and the fitting circle. The processors are operable when executing the instructions to determine whether a critical clipping of the sampling area exists by calculating a distance from the well contour center to an image edge minus a well contour radius to determine whether the result is less than or equal to a predefined distance threshold. The processors are operable when executing the instructions to determine whether a critical clipping of the sampling area exists by determining whether consecutive well contour points lie in a single line and whether the distance between two end points of the single line meets or exceeds a predefined distance threshold. The processors are operable when executing the instructions to determine whether a critical clipping of the sampling area exists further by determining whether the single line has a local curvature of zero.

One aspect of the disclosure includes one or more computer-readable non-transitory storage media embodying software that is operable when executed to receive a querying image depicting a sampling area, process the querying image using a single cluster detection model to identify one or more regions of the querying image depicting a cluster in the sampling area, process the one or more regions using a cluster verification deep-learning model to determine whether each depicted cluster is a cell cluster, determine that exactly one of the identified one or more regions depicts a cluster that is a cell cluster, and process the region depicting the cell cluster using a morphology deep-learning model to determine that there is only one cell in the cell cluster, and determine that the morphology of the cell is acceptable. Each depicted cluster comprises a cluster contour region having a cluster contour region size within a predefined range and at least a predefined number of points. Identifying the region comprises drawing a bounding box around the cluster contour region. Determining whether each depicted cluster is a cell cluster comprises verifying each depicted cluster in a corresponding position of another querying image depicting the sampling area. Determining whether each depicted cluster is a cell cluster comprises determining whether each depicted cluster appears as a cluster positive for having a cell. Determining whether each depicted cluster is a cell cluster comprises determining whether each depicted cluster does not appear as a cluster negative for having a cell. Determining that there is only one cell in the cell cluster comprises evaluating the number of contours detected in the cell cluster. Determining that the morphology of the cell is acceptable comprises identifying a cell center area and evaluating the cell center area for roundness. Determining that the morphology of the cell is acceptable comprises identifying a bright cell center area and a dark ring-shape cell membrane around the bright cell center area. Determining that the morphology of the cell is acceptable comprises identifying a bright cell center area and a bright ring-shape area outside of the cell membrane. The querying image comprises a fluorescence image or a bright-field image. The software is further operable when executed to, prior to processing the querying image, identify one or more large distinct objects in the querying image using contour detection algorithms during a pre-check stage of analysis. The software is further operable when executed to, prior to processing the querying image, determine whether the querying image is below a predetermined darkness threshold during a pre-check stage of analysis. The software is further operable when executed to, prior to processing the querying image, determine whether a critical clipping of the sampling area exists in the querying image. The sampling area is a well, the well having a well contour in the querying image defined by a plurality of well contour points and a well contour center. The software is operable when executed to determine whether a critical clipping of the sampling area exists by applying a fitting circle having a fitting circle center and a fitting circle radius to the well contour in the querying image. The software is operable when executed to determine whether a critical clipping of the sampling area exists further by calculating a fitting circle radius minus a distance of the fitting circle center to each of the plurality of well contour points to identify differences between the well contour and the fitting circle. The software is operable when executed to determine whether a critical clipping of the sampling area exists by calculating a distance from the well contour center to an image edge minus a well contour radius to determine whether the result is less than or equal to a predefined distance threshold. The software is operable when executed to determine whether a critical clipping of the sampling area exists by determining whether consecutive well contour points lie in a single line and whether the distance between two end points of the single line meets or exceeds a predefined distance threshold. The software is operable when executed to determine whether a critical clipping of the sampling area exists further by determining whether the single line has a local curvature of zero.

BRIEF DESCRIPTION OF THE DRAWINGS

FIG. 9 illustrates example images of clipped wells with clipping predictions based on the calculated values of the maximum distance to the next point in the well contour and the distance minus the radius.

FIG. 12A illustrates an example image using a strong pixel threshold resulting in a weak signal and missed cluster detection.

FIG. 12B illustrates an example image using a weak pixel threshold resulting in a strong background signal and many false-positive cluster detections.

FIG. 12C illustrates an example image where debris is mistaken as a cell using single cluster detection.

DESCRIPTION

Introduction

Figure 1:
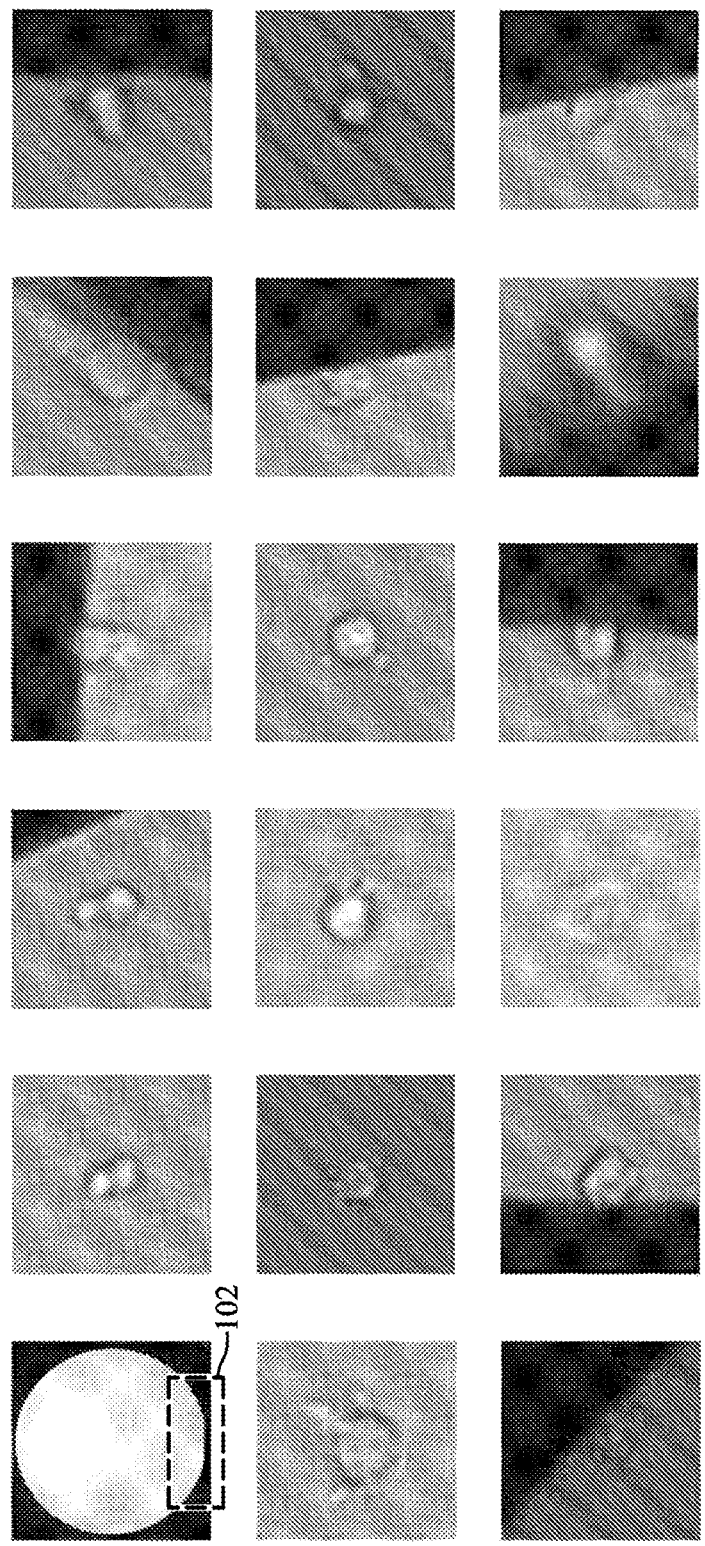
FIG. 1 illustrates single-cell image review challenges.

Current practice requires instrument generated analysis of the images taken upon plating, also referred to as Day 0 images. An imager algorithm associated with the imager is used to determine whether one or more cell is present in a well. However, variations in cell morphology and image quality may affect consistent image interpretation and therefore impact result accuracy. FIG. 1 shows examples of single-cell review challenges of zoomed-in black and white BF images taken at Day 0. Different background lighting conditions and reflections can lead to dark images, while cells outside of the focus plane of the camera can lead to blurry images. In addition, cells that are close to the well edge resulting from centrifugation can be difficult to find and lead to false-negatives. Images that are clipped and therefore incomplete, as shown in the top left image of FIG. 1 at callout 102, can lead to cells being missed. The presence of well artifacts may interfere with the visualization of a cell. The varied morphologies of cells may also lead to challenges for the imager analyzer having to decipher between a single whole cell and a cell that has started to divide, as shown in the top second image. All such circumstances can introduce errors. As such, there exists a need for a fast and reliable method for automatic CLD image characterization that can ensure that only single cells having good morphology are taken forward.

Clinical cell lines may be created for the development of recombinant protein-based pharmaceutical products, such as monoclonal antibodies (mAb). Disclosed herein is an accurate and precise automated imaging workflow to document single-cell cloning during cell line development. Image characterization is used to describe the procedures of classifying images from a cell line development study into different categories to achieve image review. In particular embodiments, a cell line development image characterization method disclosed herein may improve defect detection in images by using machine-learning algorithms. The image characterization method may use artificial neural networks to train the machine-learning models which may classify images of cells. The image characterization method may use transfer learning to reduce the number of samples required in the training of the machine-learning models. In this description, an example cell line development image characterization method is discussed that evaluates Chinese hamster ovary (CHO) cells, however in practice, implementation of an image characterization method is applicable to any mammalian cells. The method may acquire images of cells to be reviewed, classify the images of cells using the machine-learning models, and return images with unsure defects for manual inspection while passing through good images of cells.

Figure 2:
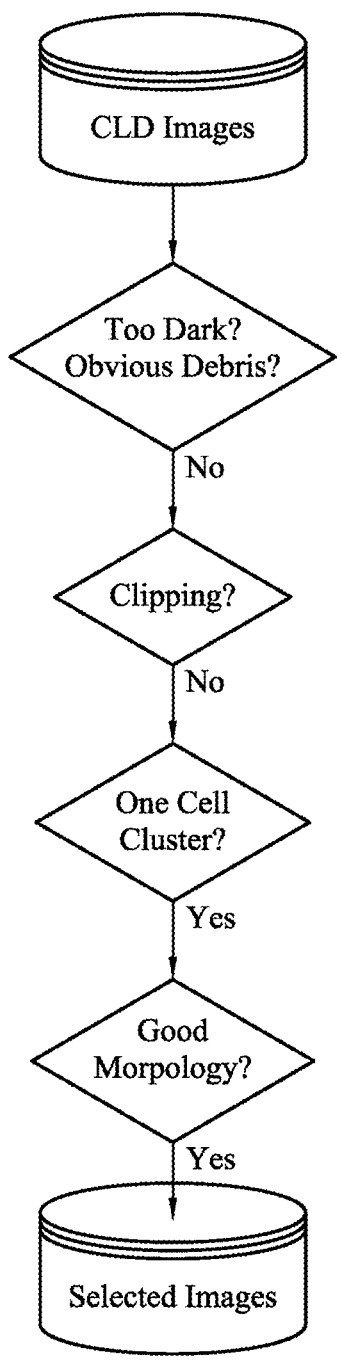
FIG. 2 illustrates an example process of CLD image selection.

The method of CLD image characterization described herein combines digital image processing techniques like transformations and filtering, and pattern recognition techniques like machine learning and deep learning. The method involves multiple steps that may be practiced on their own or together, in successive order or in alternative orders. In one embodiment shown in FIG. 2, a process of CLD image selection includes four steps performed in a specific order. The first step is a pre-check of the images acquired of plate wells at Day 0 to determine if they contain defects or are suitable for further analysis. During the pre-check stage of analysis, it is determined if the image is too dark and/or if the well includes obvious debris. In the second step, it is determined if the complete well area is captured in the image or if the image is clipped. In the third step, it is determined whether the well contains only one single fluorescent cell cluster or not. In the fourth step, it is determined whether the only one single fluorescent cell cluster is a single cell and whether the cell has good morphology. The amount of calculation required to perform each step increases, with the third and fourth steps involving deep-learning models being the most computationally intensive. This process filters out bad images at each step until a selected set of good images having a high assurance that their respective wells contain a single cell is obtained. The method of CLD image characterization is intended to replace the first round of manual image analysis performed by researchers. Implementing such an automated cell image analysis utilizing deep-learning models improves the consistency of the results and increases throughput of single-cell image analysis.

Described in the sections below are various aspects of CLD image characterization relating to (1) a single-cell cloning workflow, (2) applying CLD image characterization to a single-cell cloning workflow, (2a) imager acquisition and analysis of images, (3) pre-check of images, (3a) dark images, (3b) obvious debris in the well, (4) well area checking, (4a) criterion 1: fitting circle radius minus the distance of the fitting circle center to well contour points, (4b) criterion 2: maximum distance to a next point in the well contour, (4c) criterion 3: local curvature, (4d) criterion 4: shortest distance between the well contour center and the four edges of the image, (4e) well area checking: example image characterization results, (5) single cluster detection and verification, (5a) single cluster detection method 1: find the contour of a cluster, (5b) single cluster detection method 2: blob detection, (5c) single cluster verification: deep learning model, (6) morphology review, (6a) morphology review: image processing and analysis, (6b) morphology review: deep learning model, (7) cell detection and cell morphology: CNN prediction performance, and (8) systems and methods.

Single-Cell Cloning Workflow

Figure 3:
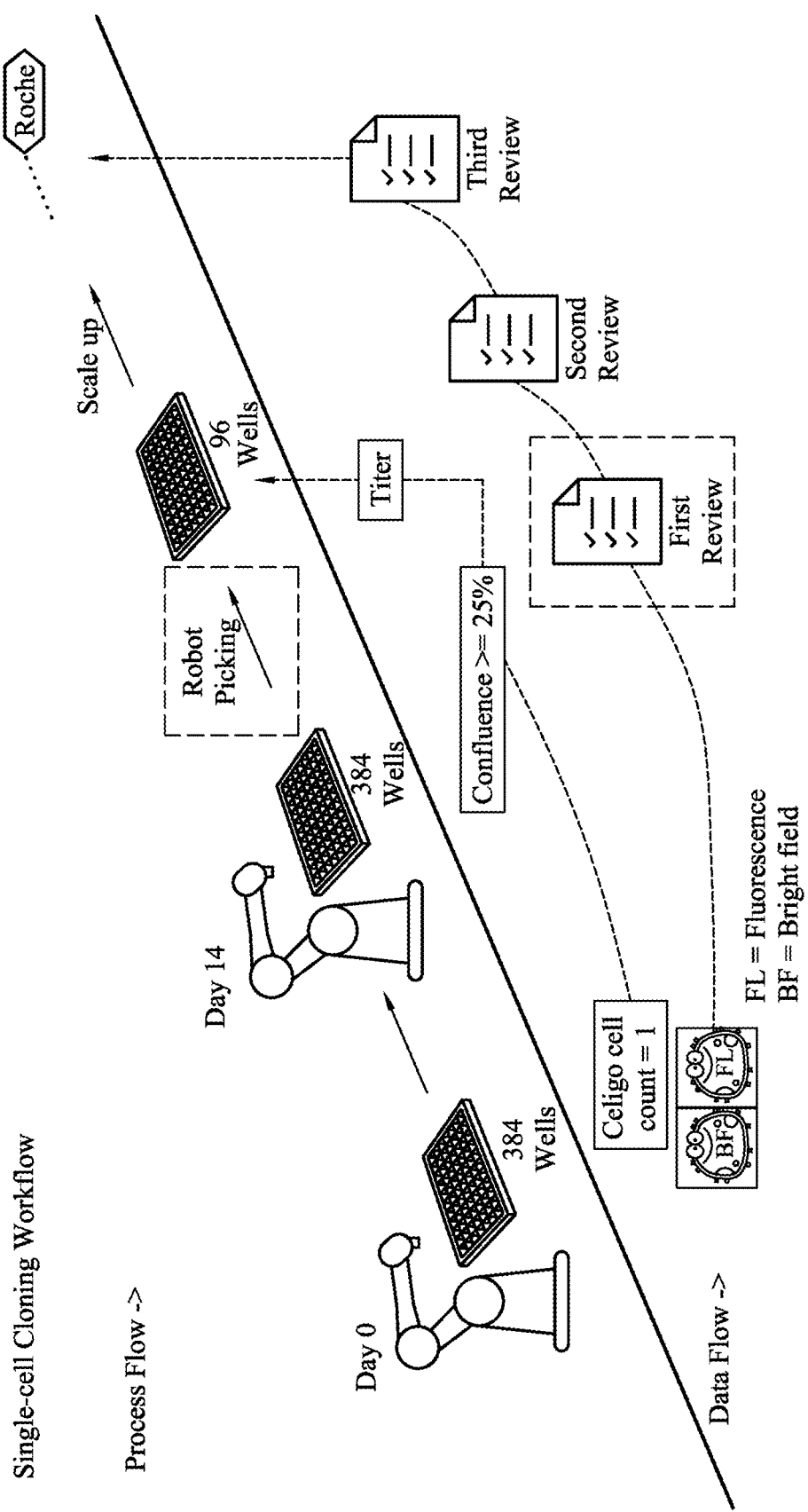
FIG. 3 illustrates an example single-cell cloning workflow.

Single cell cloning is a critical step during cell line development. FIG. 3 illustrates an example of a single-cell cloning workflow. In this example, Chinese hamster ovary (CHO) cells are stained using a fluorescent dye and seeded into a 384 well plate containing cell culture media using limited dilution cloning or single cell deposition. The plate is centrifuged at 1000 rpm for three minutes to bring the cells down to the bottoms of the wells and then immediately imaged. Full resolution bright-field (BF) and fluorescence (FL) images are acquired of each well using a Celigo® imager from Nexcelom, having a resolution of one micron per pixel. These images are referred to herein as querying images. A Celigo® imager algorithm is then used to count and determine the number of fluorescent single cells present in the wells right after plating, or at Day 0. The cells are incubated for a certain number of days, for example fourteen days, until the cells are confluent. At confluence, all 384 wells are imaged using a Celigo® imager. The confluence images are then analyzed using a Celigo® imager algorithm to determine the percentage of their well area covered by grown cells. The clones with images determined as good images at Day 0 by the Celigo® imager algorithm and exceed 25% confluence are seeded into a 96-well plate using robot picking to scale up for clone selection in fed-batch production cultures. Researches then perform the first round of image analysis to manually review the Day 0 images determined to be good by the Celigo® imager to confirm they are in fact good images of the high titer clones. This first round of manual review performed by researchers consists of up to 192 single-cell images per cell line, a process which is tedious, time-consuming, and subjective. Additional rounds of manual review take place at different stages of the cloning workflow, including a second manual review performed by a subject matter expert (SME) followed by a third manual review by a senior SME or group leader prior to cell banking.

The cell count data at the time of plating combined with the cell growth data after plate incubation is used to determine which clones will be picked by automated hit-picking workcells. As only wells that are derived from a single cell are to be cultured and further scaled up for that clone, high confidence in the results of Day 0 image analysis is desired.

As an optional first step in this workflow, a baseline BF image may be taken of each well containing cell culture media prior to cell deposition to capture the presence of plate artifacts. This provides as an additional layer of information and allows for the subtraction of the artifacts during manual image review. Identifying distinctions between the querying image and baseline image helps to distinguish cells from the artifacts after plating.

Applying CLD Image Characterization to Single-Cell Cloning Workflow

The method described herein provides as a fast and reliable method for automatic CLD image characterization and is intended to replace the first round of manual image analysis performed by researchers in the example single-cell cloning workflow of FIG. 3. It is understood, however, that the method is not limited to that use and may be applied to other single-cell cloning workflows, including those that use different sized plates, types of cells, imagers, cloning methods, image types, etc. In addition, the querying images may be associated with or depict any kind of sampling area and is not limited to a plate well.

Figure 4:
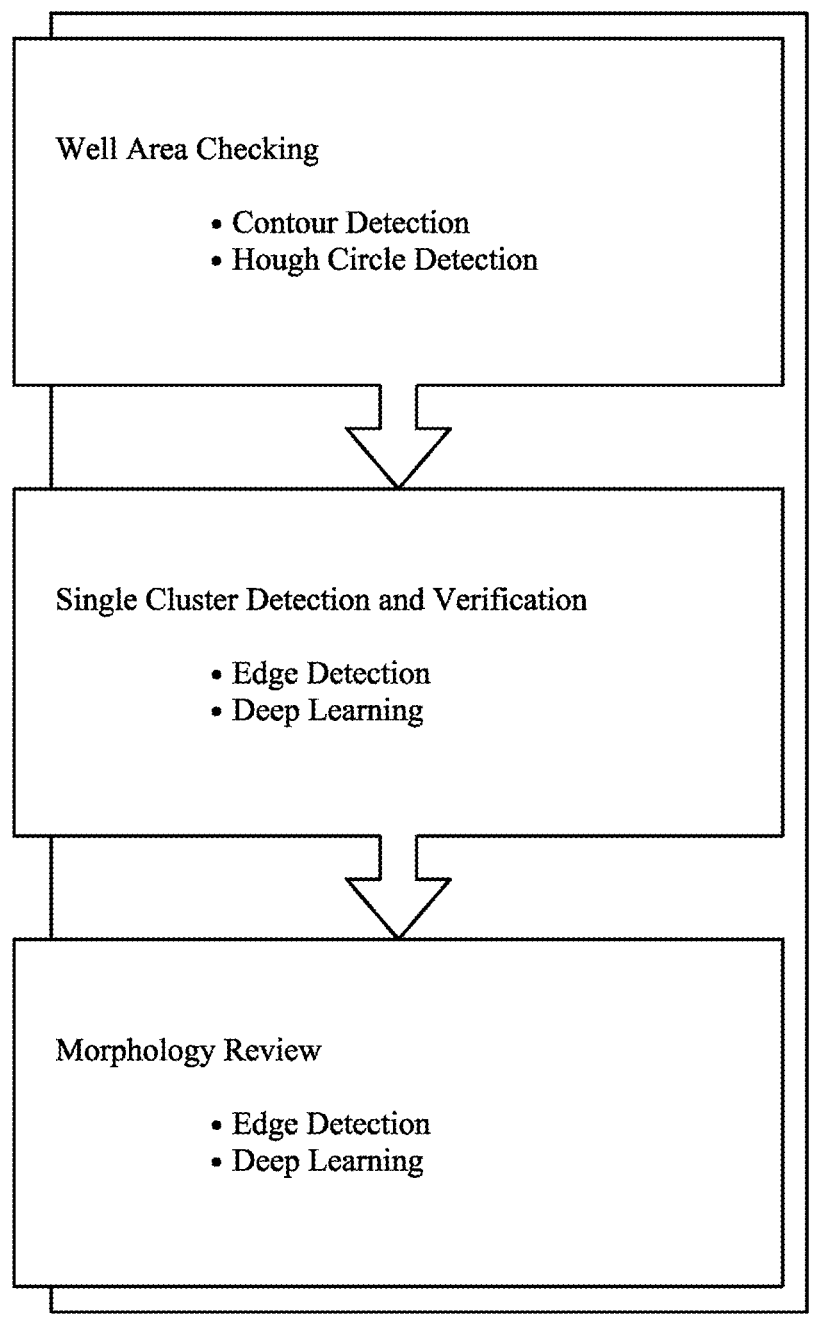
FIG. 4 illustrates an example flowchart illustrating three tasks in automatic single-cell image review, the tasks including well area checking, single cluster detection and verification, and morphology review.

The method of CLD image characterization described uses machine learning and deep learning algorithms to achieve automatic single-cell image review. Image characterization applies multiple techniques to perform three specific tasks or achieve three specific goals: 1) well area checking, 2) single cluster detection and verification, and 3) morphology review. FIG. 4 illustrates an example flowchart illustrating these three tasks or goals. For the first task of capturing as much as of the well area as feasible, the method checks the completeness and roundness of the area for each well based on the BF image. Using contour detection and Hough circle detection, wells with clippings are identified. For the second task of single cluster detection and verification, the method checks the total number of fluorescent clusters in the FL image and verifies the clusters as cell clusters in the BF image. Using edge detection and deep learning, images with more than one cell cluster are identified. For the third task regarding morphology review, the method checks if the cell cluster is a single cell and checks the morphology of the single cell in the BF image. Using edge detection and deep learning, cells are classified into different categories based on their assessed morphology.

Figure 5:
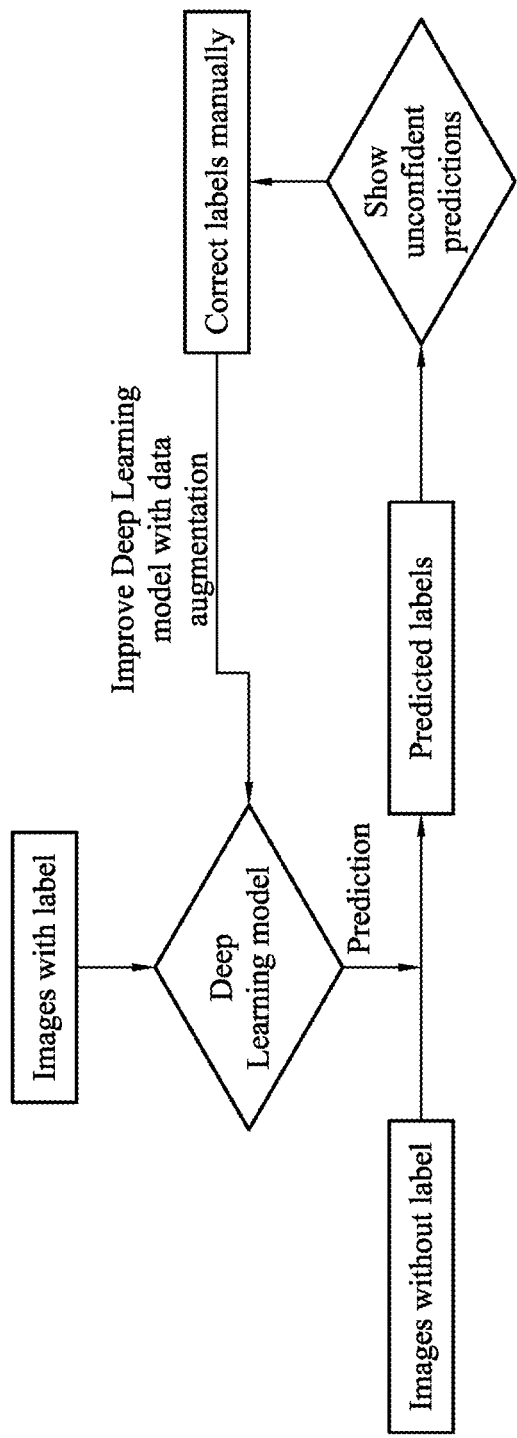
FIG. 5 illustrates an example procedure of image labeling.

An example procedure of image labeling is shown in FIG. 5. An unconfident prediction is based on the probability of predicted classification, with a low probability meaning a low confidence. The labeling procedure may be in an increasing order of confidence, with low confidence images being labeled first. As will be described in more details later, labels in the first round of the procedure may be made manually or may be made using a computer version method, such as a contour detection algorithm, or a blob detection algorithm. The labeling procedure increases efficiency as researchers do not need to label every image manually. In addition, the deep-learning models may be improved with data augmentation. Data augmentation builds new images from available images using image transformations, including flipping, zooming, shifting, rotating, etc., which helps to increase prediction performance of the deep-learning models. While already at a usable stage, by continuing to train the models to a more mature stage, performance will improve.

Imager Acquisition and Analysis of Images

After plates are seeded using single cell deposition or another cloning method such as limited dilution cloning, and then centrifuged to bring the cells to the bottoms of the wells, FL and BF images are taken of each plate well. The camera is set to focus on the bottoms of the wells so that the cells are within the focal plane. The imager acquires a single image of the entire well with no image stitching. The high-resolution live-cell FL image at the time of plating identifies with high confidence the presence and locations of live CHO cells, or other mammalian cells, that had been earlier stained with short life fluorescent dye. The high-resolution BF image at the time of plating provides sufficient resolution to confidently identify the cells. For BF imaging, a light may be shone from above the well with the image being acquired from below the well, or alternatively, the light may be shone from below the well with the image being acquired from above the well.

The querying images acquired by the high-resolution imager may capture one or more distinct objects in the well. A distinct object is a distinct-object contour region identified in the image and may be a single-cell cluster, a multi-cell cluster, debris or an artifact, a well defect, such as a broken edge, or combinations thereof. After acquiring the images, optimization of the single-cell cloning imaging analysis algorithm of the imager is carried out to identify cells within the wells. For the algorithm specific to the Celigo® imager, as an example, a cell size cut-off of 25 microns is set during automated image analysis to eliminate any large clumps of cells. Although CHO cells have a size closer to 15-20 microns, setting the cell size filter to that range dramatically reduces the number of wells the analysis software would recognize as having a cell in FL image analysis, thereby limiting the throughput of the system. Despite the settings, a small number of doublet and small clumps of cells up to 35 microns have been observed to pass through the software analysis filter. In addition, centrifugation can cause the cells to be located at or close to the well edge well instead of center of the well bottom. This may happen in up to 60% of the wells. As the cells are no longer in the focal plane of the camera in such cases, the images will appear blurry, making it difficult for the imager software to identify the cells. For at least these reasons, Day 0 image analysis by the Celigo® image analysis algorithm is not completely reliable.

The method of CLD image characterization described herein provides as a replacement for the first round of manual imager analysis of Day 0 images. The method utilizes machine learning and deep learning algorithms with selected parameters to ensure that cells are accurately and precisely identified within the wells. It results in more consistent and reliable cell count data at the time of plating than those resulting from the imager algorithm. As such, when cell count data obtained using the method disclosed herein is combined with the cell growth data after plate incubation to determine which clones to take forward, there is high assurance that only wells that are derived from a single cell will be cultured and further scaled up for that clone.

It is understood that in the following description of the method of CLD image characterization, the functions/algorithms and related parameters disclosed to perform certain functions and calculations are exemplary only, and that use of other libraries is within the scope of the disclosure. In addition, as pixel ranges are dependent on the imager, capture resolution, algorithm used, and other factors, their values may vary in practice from what is disclosed herein.

Pre-Check of Images

The CLD image characterization method may start with an optional pre-check of the Day 0 BF images. This step is performed to determine if they have defects or are suitable for further analysis. During the pre-check stage of analysis, it is determined if the image is too dark and/or if the well includes obvious debris.

Dark Images

Figure 6A:
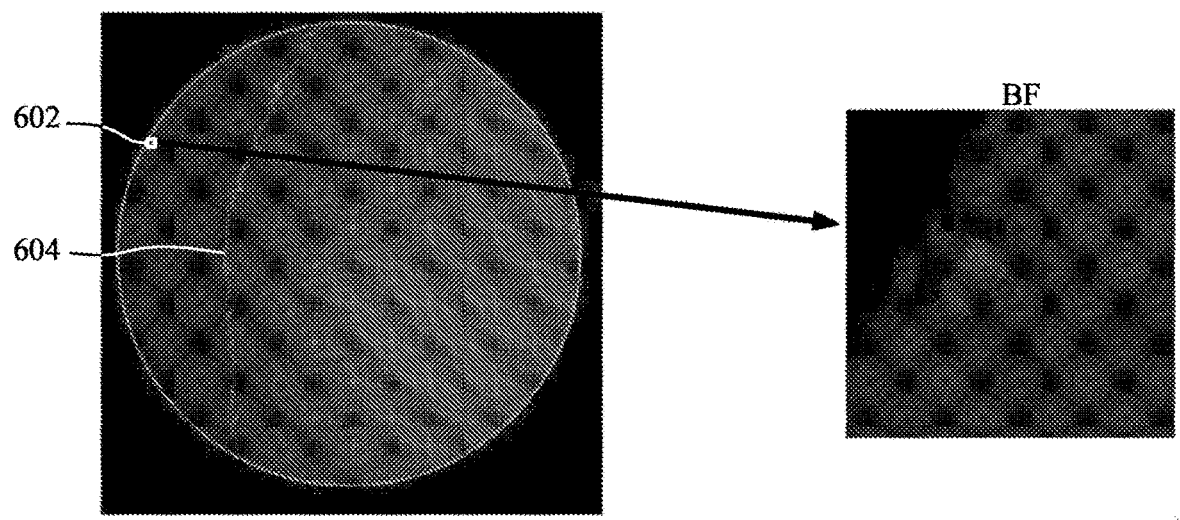
FIG. 6A illustrates an example bright-field (BF) image that is too dark to detect well contour and to see a cell clearly.

BF images are preliminarily reviewed for darkness. The threshold of binary transformation to differ the well from the background is set to 25 pixels using a threshold function. Those that are too dark may lead to mistakes in detecting well contour, which may then lead to mistakes in detecting well clipping, as will be further described later. Too dark images may also lead to mistakes in detecting the cells within the well contour. FIG. 6A illustrates an example of a BF image that is too dark to detect well contour 604, and where the left part of the well is as dark as the background, making it impossible to identify the cell shown in box 602.

Figure 6B:
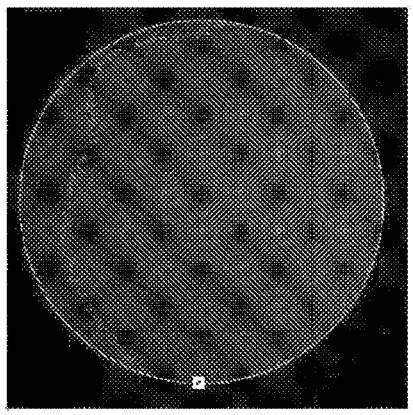
FIG. 6B illustrates an example BF image that is too dark having a $99^{th}$ percentile pixel of 52.
Figure 6C:
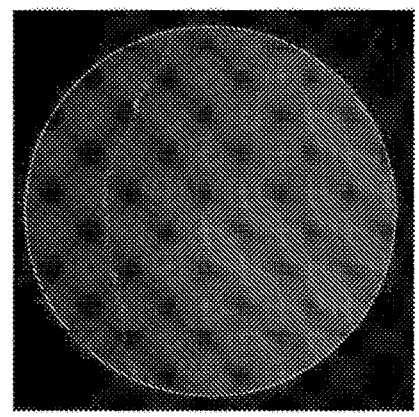
FIG. 6C illustrates an example BF image that is too dark having a $99^{th}$ percentile pixel of 63.
Figure 6D:
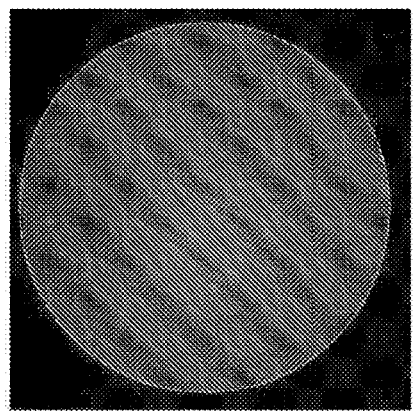
FIG. 6D illustrates an example BF image having a $99^{th}$ percentile pixel of 92.
Figure 6E:
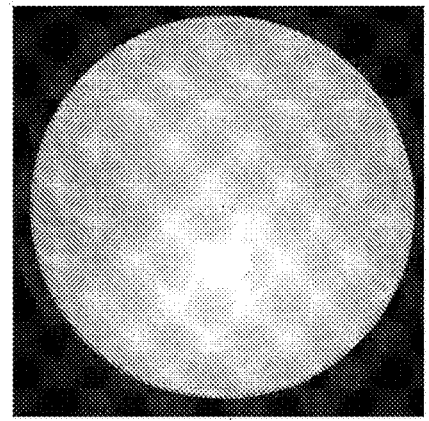
FIG. 6E illustrates an example BF image having a $99^{th}$ percentile pixel of 246.

To pre-check for darkness, the $99^{th}$ percentile pixel of a BF image is used as a criterion. BF images are considered too dark and warned if the value is smaller than 80 pixels. Images above this predetermined darkness threshold are acceptable, considered good images and continue on for further analysis. Images below this darkness threshold are considered bad images for containing a defect and filtered out. FIG. 6B and FIG. 6C illustrate other examples of BF images that are considered bad for being too dark, having a $99^{th}$ percentile pixel of 52 and 63, respectively, which are below the predetermined darkness threshold. The example BF images in FIG. 6D and FIG. 6E are considered good, having a $99^{th}$ percentile pixel of 92 and 246, respectively, which are above the predetermined darkness threshold.

Obvious Debris in the Well

Figure 7A:
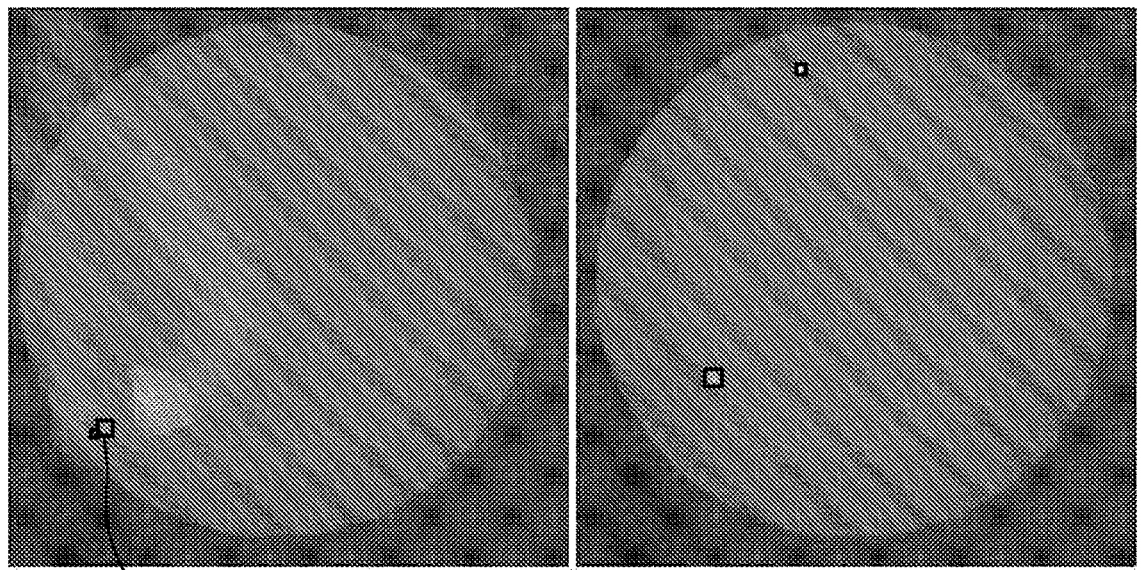
FIG. 7A illustrates examples of fluorescence (FL) images having debris that may be detected as cells mistakenly.
Figure 7B:
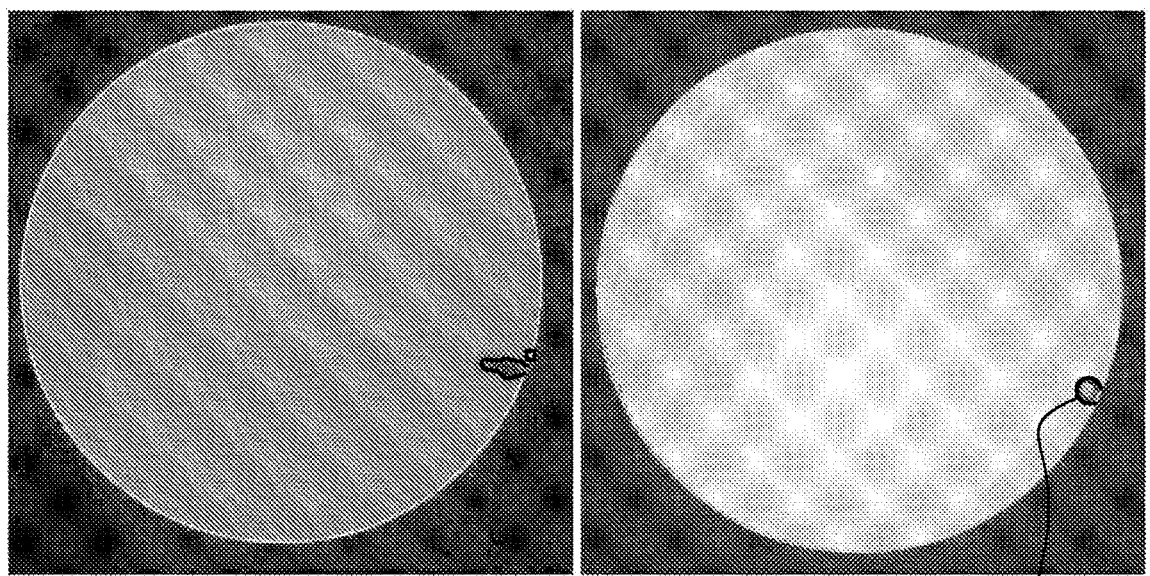
FIG. 7B illustrates examples of BF images having debris that may lead to mistakes of detecting well contour.

FL images are preliminarily reviewed for the presence of obvious debris. Obvious debris may be a large distinct object in the well having a large distinct-object contour region size within a predefined range. The presence of such debris may lead to mistakes in cell detection, so images containing them are warned. FIG. 7A illustrates two examples of FL images having some debris identified in the boxes, such as at box 702, that may mistakenly be detected as cells. Debris in BF images may also lead to errors in detecting well contour. In FIG. 7B, examples of BF images are shown having debris 704 that may mistakenly be considered as a broken well edge.

Figure 7C:
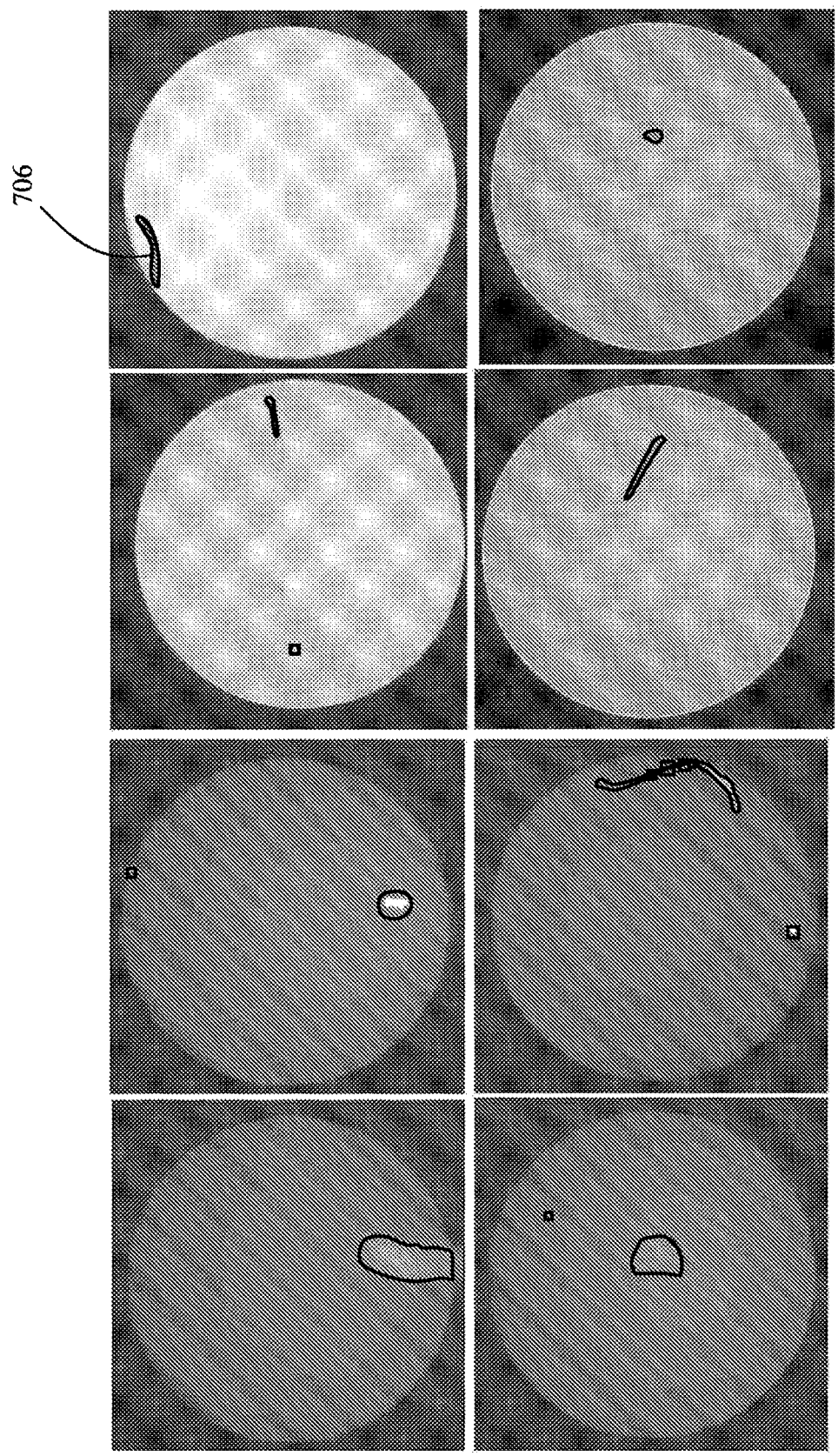
FIG. 7C illustrates examples of images with debris detected.

To pre-check for obvious debris, contour detection algorithms are used. These algorithms are similar to the ones used for cluster detection and will be discussed in greater details later. For FL images, the threshold for binary transformation is set to 40 pixels using a threshold function and the area of contour, or large distinct-object contour region size, is set to between 5000 and 1,000,000 pixels. For BF images, the threshold for binary transformation is set to 70 pixels and the area of contour, or large distinct-object contour region size, is set to between 5000 and 1,000,000 pixels. Images clear of such debris are considered good images and will continue on for further analysis. Images with obvious debris are considered bad for containing a defect and will be filtered out. FIG. 7C illustrates additional example images with debris 706 detected, some showing large or non-transparent debris that may cover cells.

Well Area Checking

To ensure that a complete review of a well to identify cells can take place, a well area checking step may be performed.

A clipped well is a well having a portion thereof cut off in an image. It may be the result of a slight alignment issue between the camera and the well. A critical clipping is a clipping that is greater than or equal to the width of a single cell, which may be 15-20 microns for a CHO cell. Such critical clippings may hide cells in that portion of the well, and therefore images having them are considered bad images for containing a defect. Non-critical clippings, which are smaller than the width of a cell, may be considered good images. To check the well area and make sure that there is no critical clipping, a tool is used to detect the contour of the well based on BF images, which generally have good contrast between wells and the image background. The threshold of binary transformation to differ the well and background is set to 25 pixels using the cv2. threshold function of opencv package. The well contour is detected using the cv2. findContours function of opencv package with option cv2. CHAIN_APPROX_SIMPLE, where the number of points defining the well contour is set to at least 100 pixels and the area of well contour is set to between 1,000,000 and 5,000,000 pixels. The well contour is fit to a circle, a fitting circle, using a Hough circle transform algorithm (cv2. HoughCircles function of opencv package) and the following parameters: method=cv2. HOUGH_GRADIENT, dp=2, minDist=1500, param1=10, param2=30, minRadius=300, maxRadius=0. The fitting circle has a radius and a center.

Figure 8A:
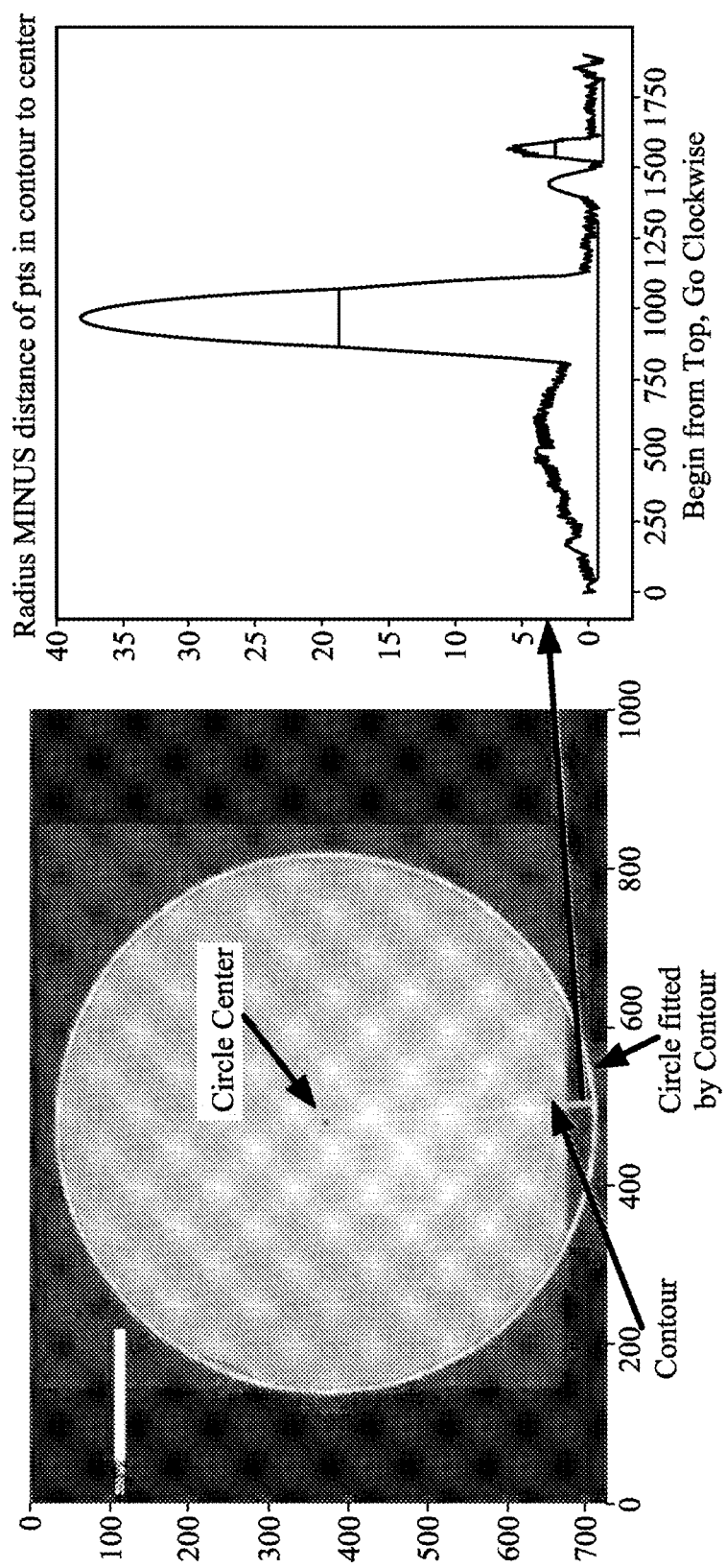
FIG. 8A illustrates a first well area checking criterion applied to an example well calculating the fitting circle radius minus the distance of the fitting circle center to the each of the plurality of well contour points.
Figure 8B:
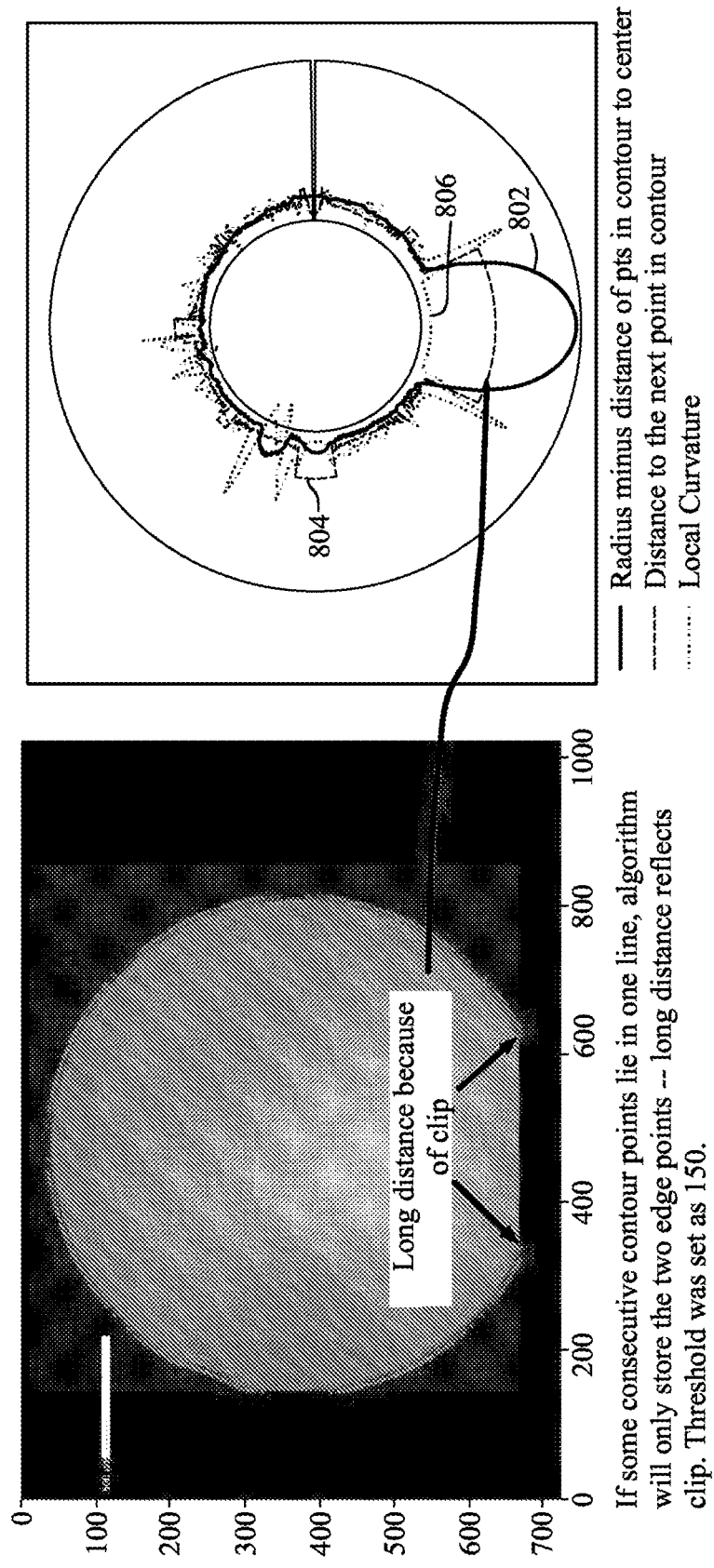
FIG. 8B illustrates a second well area checking criterion applied to the example well of FIG. 8A calculating the maximum distance to the next point in the well contour, and a third well area checking criterion applied to the example well of FIG. 8A calculating the local curvature.
Figure 8C:
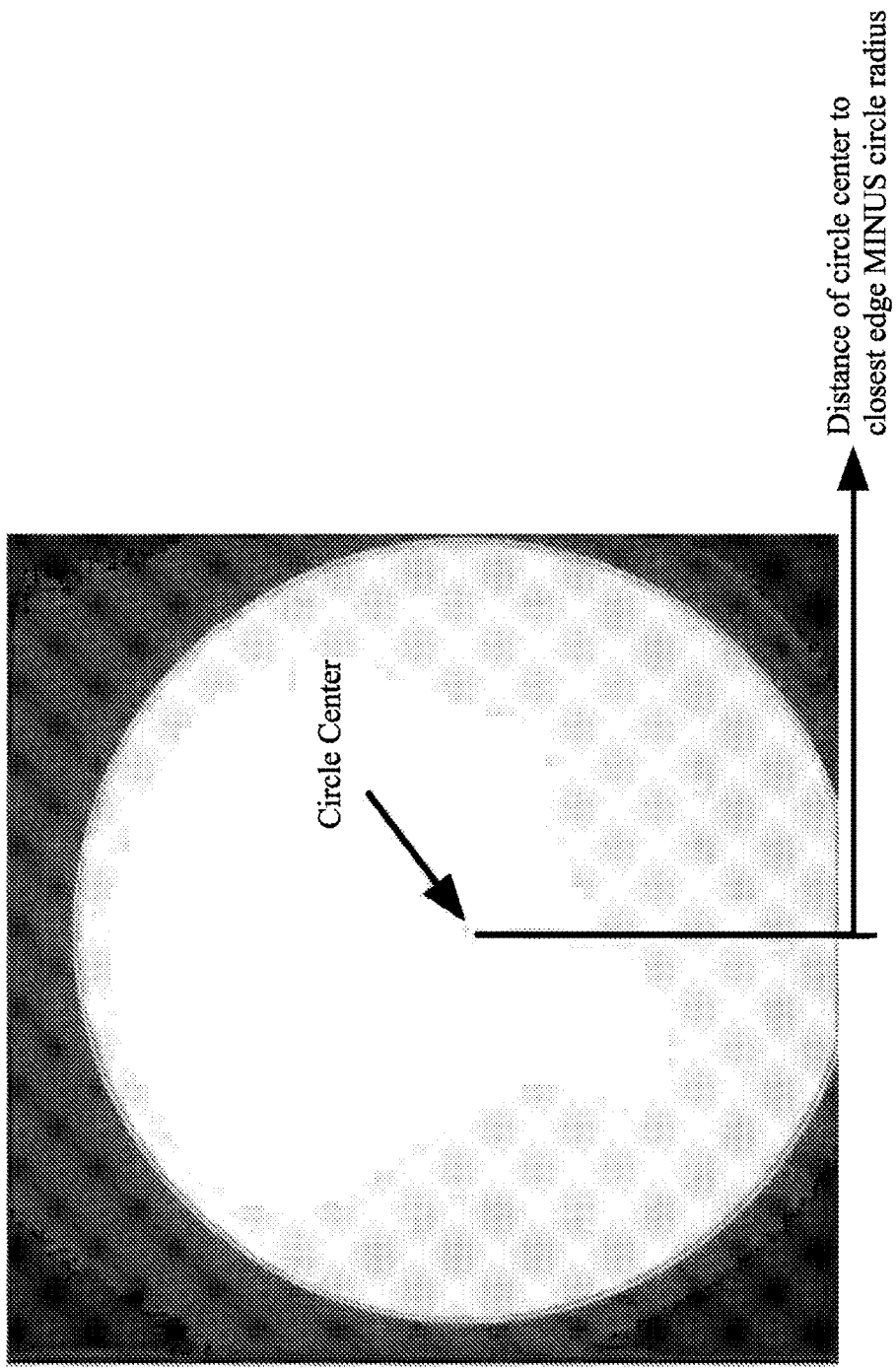
FIG. 8C illustrates a fourth well area checking criterion applied to the example well of FIG. 8A calculating the shortest distance between the well contour center and the four edges of the image.

An image processing tool utilizing four well area checking criteria, or methods, is implemented to detect a well area clipping, though any number and combinations of the four criteria may be used. The four methods for detecting well clippings applied to the same example well are illustrated in FIGS. 8A-8C. Images determined to have a critical clipping of the well area are considered bad images. Those wells may be reimaged on the same or different imager on Day 0 or the images may be filtered out, not continuing on for further analysis.

Criterion 1: Fitting Circle Radius Minus the Distance of Fitting Circle Center to Well Contour Points This method can detect not only well clippings, but also other well defects. The first well area checking criterion detects the difference between the well contour (i.e., "Contour") and its fitting circle (i.e., "Circle fitted by Contour"), shown in the left image of FIG. 8A. The difference is calculated as the fitting circle radius minus the distance of the fitting circle center (i.e., "Circle Center") to each of the plurality of well contour points. The calculated difference is plotted beginning from the top of the well contour and going in a clockwise direction, as shown in the right image of FIG. 8A. The find_peaks function of python scipy.signal package (parameters: prominence=0.7, width=100, height=30) is used to detect the peaks, or greatest differences, between the well contour and its fitting circle based on the calculation. The big peak in the center corresponds to the clipping at the bottom side of the well, and the two small peaks after it correspond to the small clipping in the left side of the well and small broken edge in the top left side of the well, respectively.

Criterion 2: Maximum Distance to Next Point in Well Contour

The second well area checking criterion detects a well clipping by detecting a straight line in the well contour, shown in the left image of FIG. 8B. If some consecutive well contour points lie in a single line, as would happen with a clipped edge, the image processing algorithm will only store the two end points of the edge. The distance between two continuous contour points is calculated, and a predefined maximum distance is used as the criteria for clipping. The predefined distance threshold is set at 150 pixels, where distances between consecutive well contour points greater than or equal to 150 pixels are predicted as clippings. The larger the calculated distance, the larger the clipping. In the figure, a large distance is calculated between the two end points of the edge, thereby indicating one big clipping at the bottom side of the well. One small clipping at the left side of the well is also detected.

Criterion 3: Local Curvature

The third well area checking criterion checks the local curvature of the line of criterion 2, with the local curvature of a straight line being zero. The localCurvature function of R EBImage package is used to calculate the local curvature of the well contour, and the length of the uninterrupted curvature window is set at 101 pixels. The three criteria of clipping described so far are shown in the circular plot in the right image of FIG. 8B. In the areas of clippings at the bottom and left sides of the well, the corresponding distances calculated for criterion 1 (solid line 802) and criterion 2 (dashed line 804) are both large, while local curvature calculated for criterion 3 (dotted line 806) is zero.

Criterion 4: Shortest Distance Between Well Contour Center and Four Edges of Image The fourth well area checking criterion illustrated in FIG. 8C detects if the well contour center (i.e., "Circle Center") is too close to the image edge. This method for detecting well clipping is based on that clipping can only occur on one of the four sides of the image and is parallel with the image side. The shortest distance between the well contour center and the four sides of the image is calculated. The well will be predicted as clipped if the distance, calculated as the distance of the well contour center to the closest image edge minus the well contour radius, is less than or equal to a predefined distance threshold. The threshold is set at five (i.e., distance−radius≤5 pixels). The closer the calculated distance is to the threshold, the smaller the clipping is.

Well Area Checking: Example Image Characterization Results

In one example, the second criterion and the fourth criterion are used to detect well clippings. The well is predicted as clipped if the maximum distance to the next point in the well contour is greater than or equal to 150 pixels, or if the distance of the well contour center to the closest image edge minus the well contour radius is less than or equal to five pixels. Table 1 is a confusion matrix of well clipping predictions using the second and fourth criteria showing that the algorithms work and that the criteria are good indicators of clipped wells. The 390 false-positives are where the algorithms failed to detect tiny clippings, which may be acceptable if they are non-critical clippings. When the distances calculated for the two criteria are close to their respective predetermined threshold distance, further review may take place to minimize the number of false-positives reported.

TABLE 1

Confusion matrix of well clipping predictions
using second and fourth criteria.

|  |  | Truth | |
|---|---|---|---|
|  |  | Clipped | Good |
| Predicted | Clipped | 3,382 | 390 |
|  | Good | 6 | ~6,000 |

FIG. 9 illustrates examples of clipped wells with clipping predictions based on the calculated values of the maximum distance to the next point in the well contour (criterion 2) and the distance of the well contour center to the closest image edge minus the well contour radius (criterion 4, i.e., distance–radius). In the lowest left image, a correct prediction of clipping was made. Due to the tiny size of the clipping, it may be considered a non-critical clipping, which is not large enough to hide a cell, such as a cell in box 902. In the lowest right image, a wrong prediction may have been made because the well contour is not an exact circle.

Single Cluster Detection and Verification

The images acquired by the high-resolution imager may capture one or more distinct objects in the well. A distinct object may be a single cell cluster, a multi-cell cluster, debris or an artifact, a well defect, such as a broken edge, or combinations thereof. The disclosed method of CLD image characterization may be used to distinguish a cluster, which is a distinct object having specific characteristics, from other types of distinct objects. For the second task or goal of single cluster verification, the method checks the total number of fluorescent clusters in the FL image and verifies the clusters as cell clusters in the BF image. Using edge detection and deep learning, images with more than one cell cluster are identified. Images with only one cell cluster detected are considered good images and continue on for further analysis. Images with no cell clusters or more than one cell cluster are considered bad images for containing a defect and are filtered out.

Single Cluster Detection Method 1: Find the Contour of a Cluster

Figure 10:
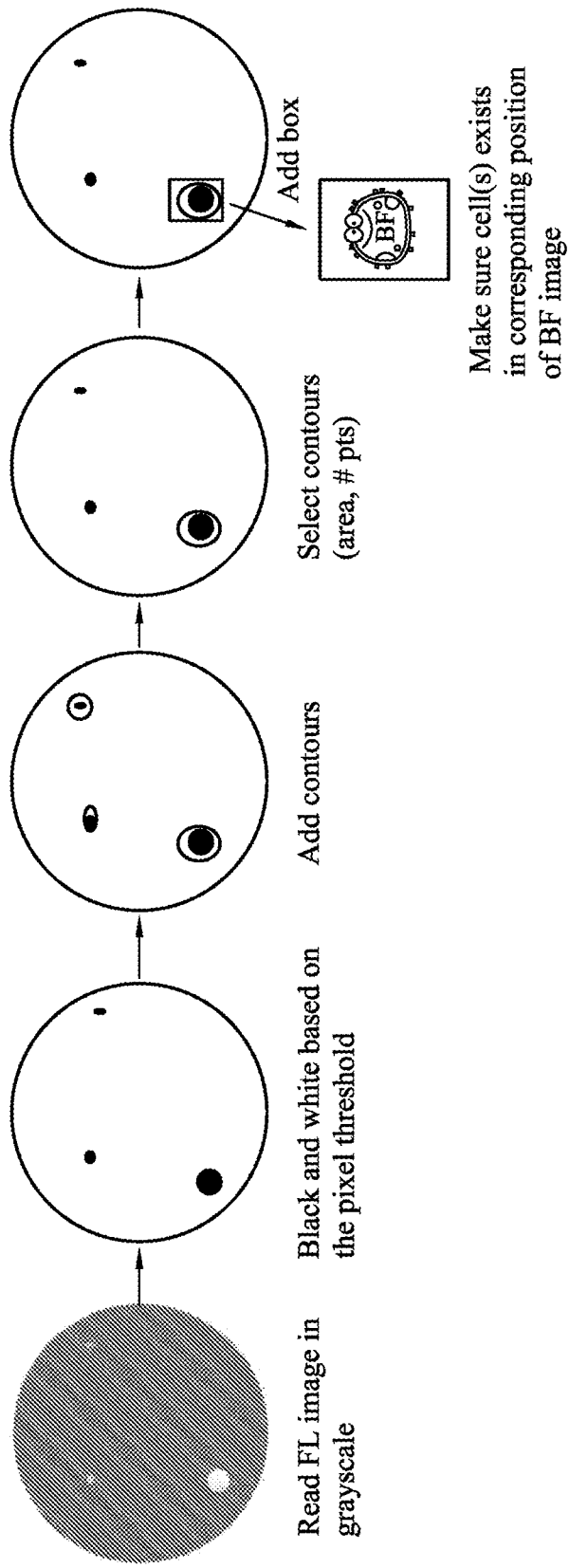
FIG. 10 illustrates an example procedure of detecting a cluster from a FL well image using contour detection.

FIG. 10 illustrates an example procedure of detecting a fluorescent cluster in a FL well image using a single cluster detection model. In such procedure, software analysis filters and contour detection algorithms are used to identify the interest points within the well. The first and second steps involve reading the FL image in greyscale (cv2. imread function with option 0) and turning it into a binary, black and white image (cv2. threshold with option cv2. THRESH_BINARY_INV, threshold=30 pixels). The third step finds distinct-object contour regions shown as black areas in the image (cv2. findContours function with cv2. CHAIN_APPROX_TC89_KCOS option) and adds contours around them. In the fourth step, the distinct-object contour regions are then filtered based on their area and number of points. In the example of FIG. 10, the distinct-object contour region size is set to a predefined range of 50 to 3000 pixels, and a predefined number of points in the distinct-object contour region is set to at least 10 pixels. In the fifth step, a bounding box is drawn or added around the selected distinct-object contour region meeting the size and points criteria of the previous step using the cv2. rectangle function and extended 10 pixels on each side of the contour. This selected distinct-object contour region is a cluster. As a cluster, this distinct-object contour region is considered a cluster contour region, which has a cluster contour region size within the predefined range of 50 to 3000 pixels and has at least the predetermined number of points of 10 pixels.

As previously described, a similar contour detection algorithm is used in the pre-check of images for the presence of obvious debris, which are large distinct objects. For that application, the parameters include a predefined large distinct-object contour region size range set between 5000 and 1,000,000 pixels. As such, the predefined large distinct-object contour region size range for identifying obvious debris is larger than the predefined distinct-object contour region size range for identifying clusters.

Single Cluster Detection Method 2: Blob Detection

An alternative single cluster detection model to contour detection is blob detection. Candidate clusters are found in the FL image using a blob detection algorithm (cv2. SimpleBlobDetector_Params, cv2. SimpleBlobDetector_create, cv2. detect functions from opencv package). The image is turned into a binary image having a pixel threshold set at 30. Filtering parameters include a predetermined number of points in the distinct-object contour region set to at least 10 pixels, and the distinct-object contour region size set to a predetermined range between 50 and 3000 pixels in 2052*2052 scale. A box is added around selected distinct-object contour regions meeting the size and points criteria of the previous step (cv2. rectangle function) and extended 10 pixels on each side of the contour. These selected distinct-object contour regions are clusters.

Figure 11:
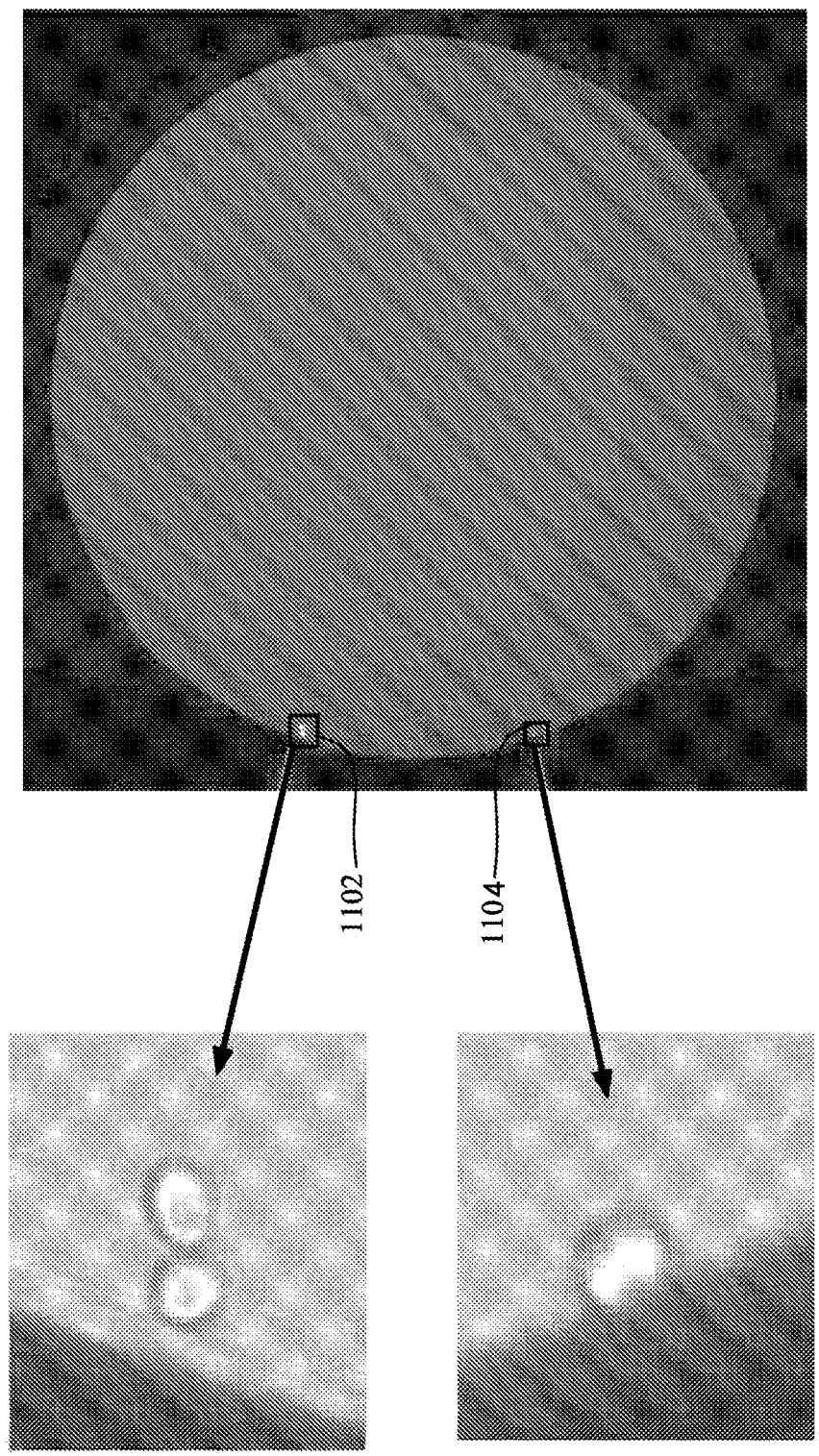
FIG. 11 illustrates example images of two clusters correctly detected using blob detection.

In general, both single cluster detection models of contour detection and blob detection described here have similar performance in detecting clusters. FIG. 11 illustrates example images of two clusters, one cluster in each box 1102 and 1104, correctly detected using blob detection. However, there are some challenges associated with the single cluster detection methods described. One such challenge is based on thresholds. Using a strong pixel threshold may result in a signal too weak to detect all clusters in the well, leading to false-negatives. A missed cell due to a weak signal is shown in FIG. 12A. Along the same line, a weak pixel threshold, such as 20 or 25 pixels, may result in too strong a background signal and many false-positive cluster detections. The false-positives identified in the several boxes 1202 in FIG. 12B may be debris or plate artifacts. Errors based on thresholds are amplified in images that are not of good quality, such as dark or out of focus images.

Single Cluster Verification: Deep Learning Model

Cluster detection is used to count the number of clusters and identify their locations within a well. However, cluster detection is limited in the information it provides about the cluster itself. As it is a primary goal of single cell cloning to ensure there is only one cell in the well at Day 0, it would be beneficial to know whether the clusters detected in a well include at least one cell. The implementation of single cluster verification following single cluster detection is a step towards achieving that goal. In single cluster detection, one or more locations and/or regions of the querying image, specifically the FL image, depicting a cluster in a sampling area (e.g., well) is identified by processing the querying imaging using the single cluster detection model. The location of each cluster may be returned by the single cluster detection model as a coordinate (e.g., x/y pixel location) in the image, as a bounding box location (e.g., again, by x/y pixel boundaries), a contoured area including the cluster, or another similar portion of an image (also referred to as a region of the querying image throughout). Shown as the last step in FIG. 10, single cluster verification then confirms the presence of at least one cell within the corresponding position of the BF image identified using single cluster detection, thereby ensuring that the cluster includes at least one cell. In other words, single cluster verification confirms the cluster as a cell cluster. Images with no regions of the image identified are considered bad images and are filtered out.

Stated another way, single cluster verification enhances single cluster detection. It uses a cluster verification deep-learning model to distinguish cell clusters from non-cell clusters, such as debris, in the well. Implementation of single cluster verification may prevent clones from being discarded or taken forward due to misinterpretations of plate artifacts and debris as cells or cells as plate artifacts and debris. The one or more regions of the querying image identified by the single cluster detection model as depicting a cluster in the sampling area are then processed by the cluster verification deep-learning model to determine whether each depicted cluster is a cell cluster. The output of the cluster verification deep-learning model is a binary categorization of a querying image as either a good image or a bad image.

An image is categorized as a good image if the cluster verification deep-learning model determines that exactly one of the regions depicts a cluster that is a cell cluster, and therefore, the sampling area contains only one cell cluster. An image is categorized as a bad image if the cluster verification deep-learning model determines that none of the regions or more than one region depicts a cluster that is a cell cluster, and therefore, the sampling area contains no cell clusters or more than one cell cluster, respectively. In practice generally, of the clusters identified using single cluster detection, approximately 80% are actual cell clusters while the rest are not cell clusters. For example, in cases where debris meets the same size and points criteria required of a cluster in single cluster detection, debris may be identified as a cluster. This is shown in the example image of FIG. 12C at box 1204. Use of single cluster verification following single cluster detection would verify that no cell exists in the cluster, and that the cluster is not a cell cluster, but rather, debris. Given that the single cluster contains no cells, it is concluded that the well contains no cells. As such, the image would be considered a bad image containing a defect and filtered out with no further analysis performed.

Figure 13:
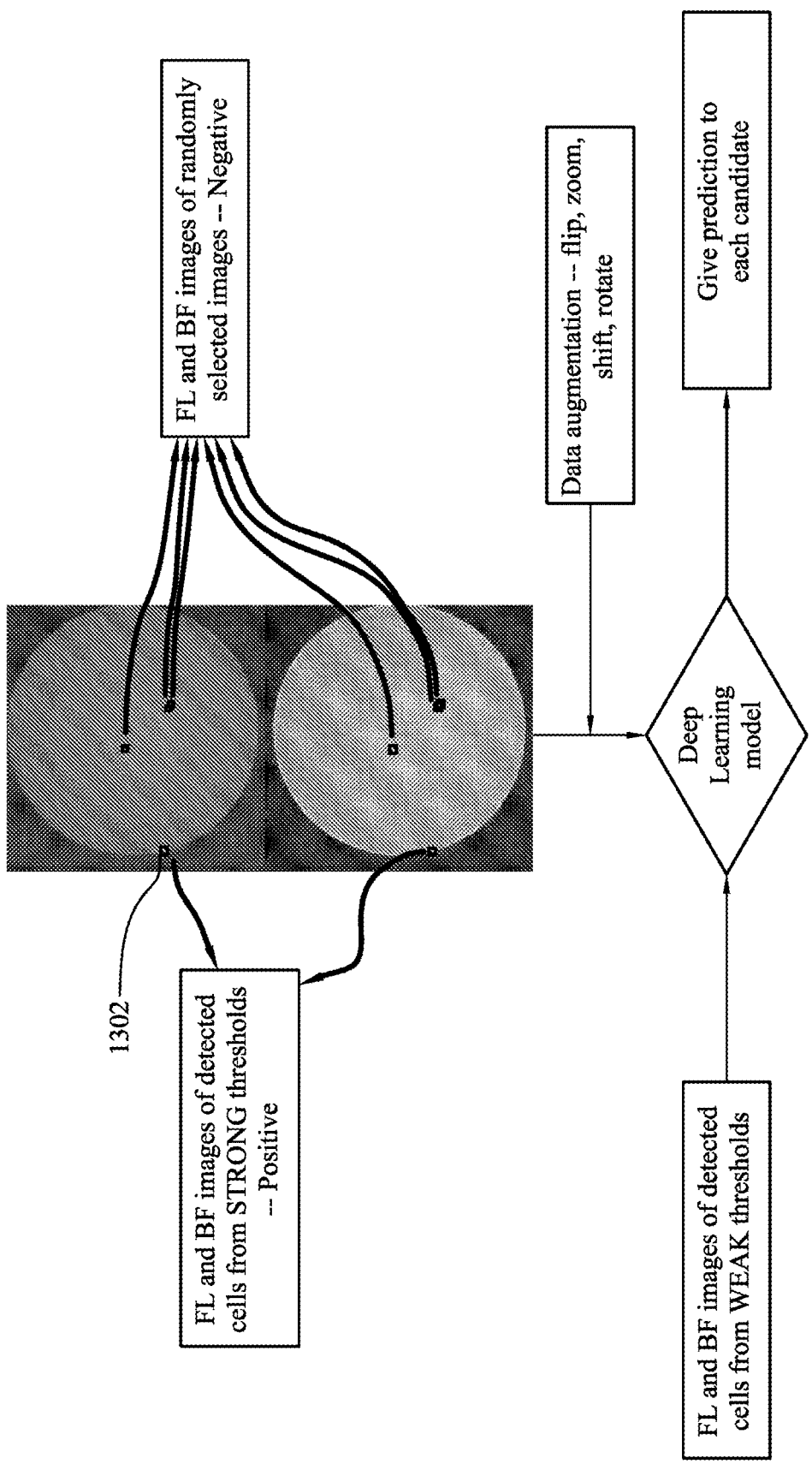
FIG. 13 illustrates an example cluster verification deep-learning model to identify cell clusters.

An example of a cluster verification deep-learning model is shown in FIG. 13. The input to this model is one or both of a region of a FL image and a region of a BF image, and the output from the model is the identification of cell clusters and their locations within the wells. Additionally or alternatively, the model may return a binary determination of whether the whole image including the analyzed region is a good image or bad image. In one specific implementation, identifying a cell cluster in the region of the image includes calculating a confidence score for a candidate cell cluster, and determining, for the candidate cell cluster, a cell cluster indication based on a comparison between the confidence score and a predefined threshold score, where a cell cluster indication may be a cluster contour portion of an image including at least one cell. In one example embodiment, the architecture of the deep learning model is a VGG16 CNN model, however other neural network model architectures may also be used.

For model training, FL and BF images (or regions thereof) of detected clusters using high thresholds are combined and used to train the model what cell clusters (i.e., clusters positive for having a cell) may look like. In the example of FIG. 13, there is one cell cluster identified in the top strong threshold FL image at box 1302 using blob detection, which is verified in the corresponding position of the bottom strong threshold BF image. In addition, FL and BF images of randomly selected images are combined and used to train the model what non-cell clusters (i.e., clusters negative for having a cell, such as debris) may look like. In the example, a random selection of other areas of the well where there are no cell clusters are used to help the algorithm understand the difference between a cell cluster and non-cell cluster. Such training helps with confidence score calculation and the confusion matrix so it can be more accurate. The deep-learning model is improved with data augmentation to build new images from available images using image transformations, including flipping, zooming, shifting, rotating, etc., which helps to increase prediction performance of the deep learning model. FL and BF images of clusters detected using weak thresholds so to include many clusters are also fed into the deep learning-model, which then gives a prediction to each candidate cluster. This example cluster verification deep-learning model has an accuracy of 99.3% on validation data.

The deep-learning model described herein for single cluster verification determines whether an image is good or bad depending on the prediction it gives to each candidate cluster. If either more than one candidate cluster or no candidate cluster in an image has a high probability of having a cell, the image is considered bad. It is filtered out and does not proceed on to further analysis. If only one candidate cluster has a high probability of having a cell, the image is considered good and continues on to morphology review.

As introduced in the prior paragraphs, transfer learning and image augmentation are used to enhance the performance of the cluster verification deep-learning model. Transfer learning refers to training a base, or auxiliary, CNN on an auxiliary dataset and task, thereby developing certain parameters, and later utilizing a target dataset and task to further refine those parameters. Transfer learning is performed on the same model architecture with ImageNet or other custom dataset. For cluster verification in the method of CLD characterization disclosed herein, a plurality of first target training samples is accessed, the first target training samples including a plurality of first target training images associated with sampling areas and a plurality of cell cluster indications associated with the plurality of first target training images, respectively. A plurality of first auxiliary training samples is selected based on the first target training samples, the first auxiliary training samples including a plurality of first auxiliary training images and a plurality of first content categories associated with the plurality of first auxiliary training images, respectively. The cluster verification deep-learning model is then trained by training a first auxiliary machine-learning model based on the plurality of first auxiliary training samples and training the cluster verification deep-learning model based on the trained first auxiliary machine-learning model and the plurality of cell cluster indications. The plurality of first content categories associated with the plurality of first auxiliary training images do not match the plurality of cell cluster indications associated with the plurality of first target training images.

Morphology Review

Once a well is determined as not having a critical clipping through well area checking, and as including only one cell cluster through single cluster verification, the image continues to morphology review. In morphology review, image processing and analysis or a deep learning model is used to determine the number of cells within the cell cluster and the acceptability of the cell morphology.

Morphology Review: Image Processing and Analysis

Figure 14B:
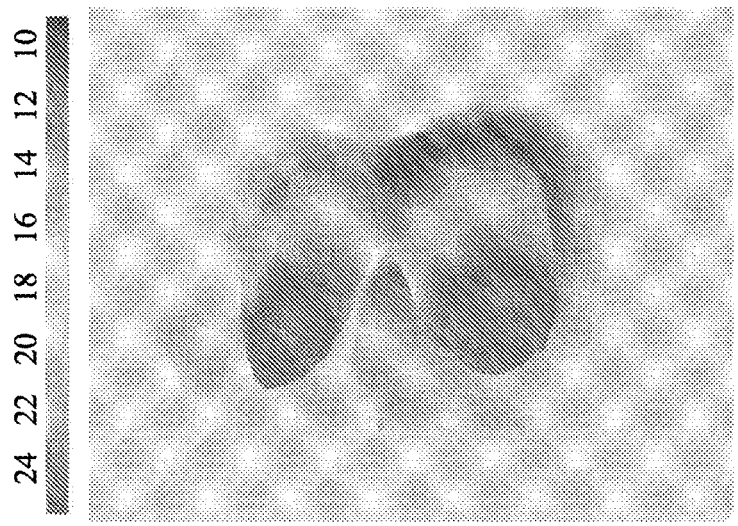
FIG. 14B illustrates the three-dimensional (3D) surface of the cell cluster of FIG. 14A.
Figure 14A:
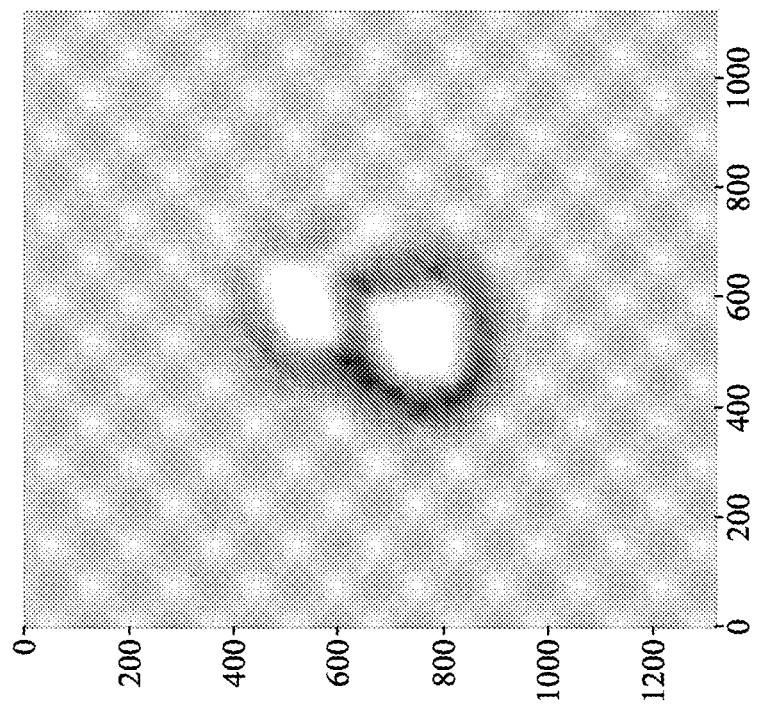
FIG. 14A illustrates an example original zoomed-in cell cluster image in greyscale.

A cluster verified as a cell cluster may include, for example, a single cell, multiple overlapping cells, or a cell that has already started to divide. In the latter two instances, those clones would not be carried forward. With morphology review, the goal is to identify cell clusters that include a single cell having good morphology. The method of reviewing cell morphology is based on the observation that in the images, cells have a bright center and a dark cell membrane boundary. FIG. 14A shows an example of a cell cluster, around which a bounding box had been added during cluster detection. The cell cluster is zoomed-in on to provide as an original greyscale image for morphology review. FIG. 14B illustrates the 3D surface of the cell cluster of FIG. 14A, showing a cell center as a hill and a cell membrane as a surrounding valley. The method of reviewing morphology as described here detects and builds the contour of the cell, and then predicts the number of cells (e.g., number of contours detected) and the cell morphology (e.g., roundness of the cell) based on it.

Figure 15:
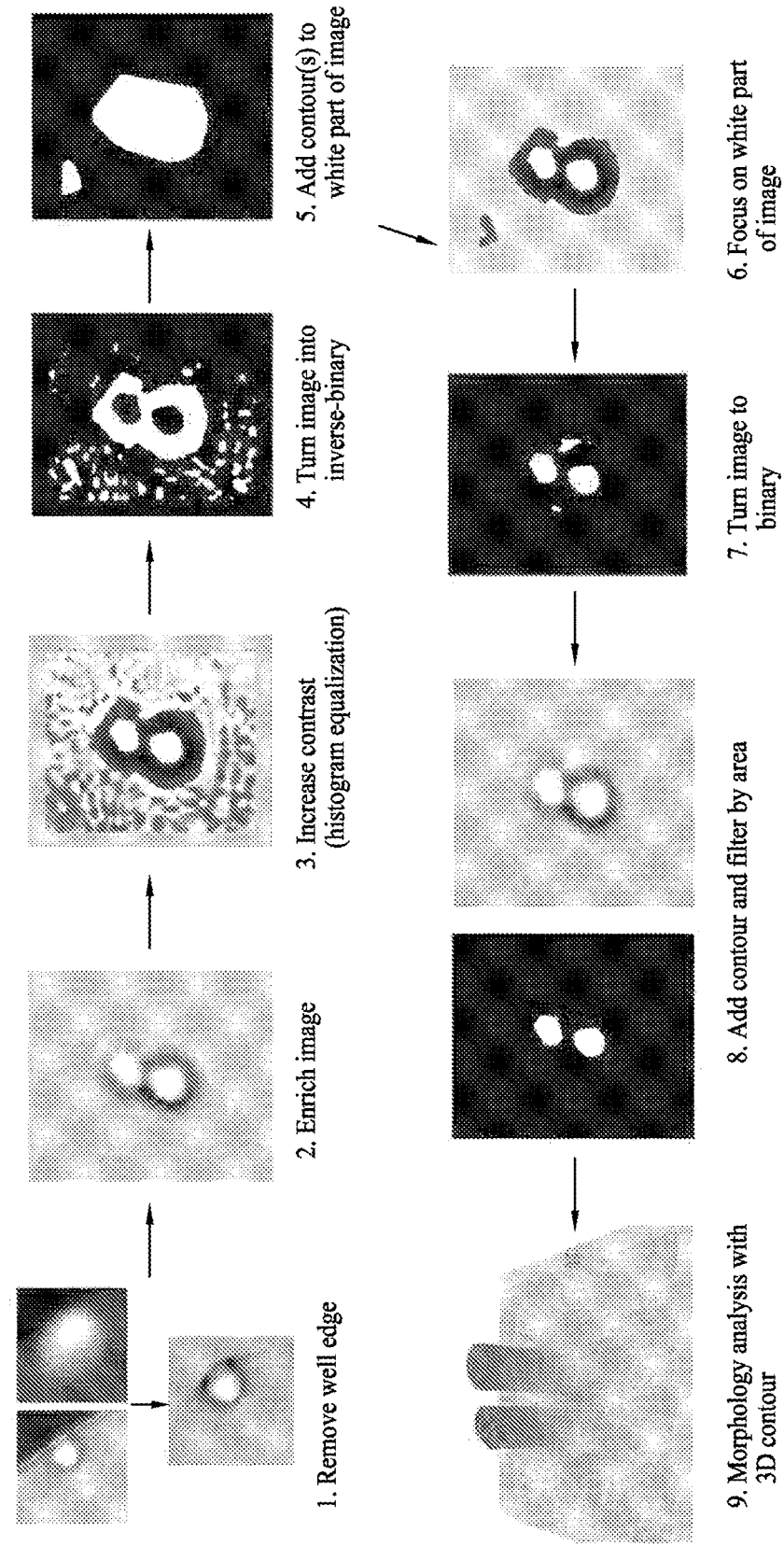
FIG. 15 illustrates an example method of determining cell morphology using image processing.

FIG. 15 shows an example method of determining cell morphology involving nine steps and using multiple image processing techniques. The procedure described is exemplary only. It is understood that a number of other image processing techniques for reviewing cell morphology may be used. Procedures having additional or less steps, or steps performed in alternative orders are within the scope of the disclosure.

Step 1: Remove well edge. In the first step, a bright area including a cell is identified in an FL image (top right image), and the corresponding position of this area in a BF image (top left image) is replaced with the median value in the BF image (bottom image). This may sufficiently remove the well edge and black background in the BF image to remove any disturbance that may come from them during further analysis.

Step 2: Enrich image. In the second step, the image points are enriched using B-spline interpolation (cv2. resize function with ratio 20).

Step 3: Increase contrast. In the third step, the contrast of the BF image is increased (histogram equalization using cv2. equalizeHist function) to better clarify the boundary of the cell in the image.

Step 4: Turn image into inverse-binary. In the fourth step, the image is turned into an inverse-binary image by threshold (black to white, white to black) using the cv2. threshold threshold function with a threshold set to 40 pixels and the cv2. THRESH_BINARY_INV option.

Step 5: Add contour(s) to white part of image. In the fifth step, contour(s), or convex hull, is added to the white part of image using the cv2. findContours function with number of points in the contour set to at least 10 pixels and the cell area set to between 50 and 3000 pixels. The convex hull was built using the cv2. convexHull function.

Step 6. Focus on white part of image. In the sixth step, remove the area with grayscale larger than 0 and only focus on the image corresponding white part of the image from the previous step.

Step 7: Turn image into binary. In the seventh step, the previous image is turned into a binary image by threshold of 0.8 pixel ($99^{th}$ percentile of pixels on BF image).

Step 8: Add contour and filter by area. In the eighth step, contours are added to the previous image using the cv2. findContours function and filtered by area set between 50 and 3000 pixels.

Step 9: Morphology analysis with 3D contour. In the ninth step, an analysis is performed of the image showing a 3D surface with contours.

In this example, the cell cluster is shown in the final 3D image as having two distinct hills, each surrounded by a valley. As the number of cells in the cell cluster is based on the number of contours detected, it is determined that there are two cells in this cell cluster. And as cell morphology is based on the roundness of the contour, it is determined that this cell cluster has bad morphology. Because the cell cluster is determined to not be a single cell cluster, but rather a multi-cell cluster, the image is considered had for containing a defect and will be filtered out. If it is determined that a cell cluster contains only one cell and is in fact a single cell cluster having good morphology, the image is considered good. Based on that good image, it may be concluded that there is only one cell in its respective well at Day 0.

Figure 16:
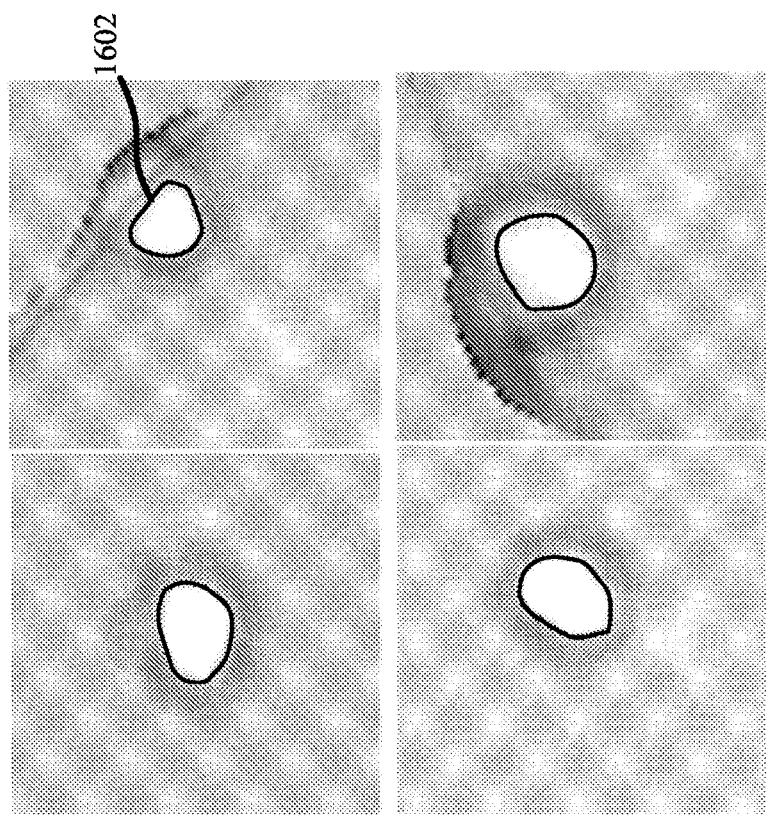
FIG. 16 illustrates examples of cell contour method successes.

FIG. 16 illustrates examples of cell contour method successes. Using the image processing techniques and analysis described, a single contour having sufficient roundness, as indicated by the ring 1602, is identified in each image. Accordingly, the cell clusters are correctly determined to be single cell clusters, with the cells having good morphologies. The method works well if the images are of good quality, being bright enough and in focus.

Morphology Review: Deep Learning Model

Figure 17:
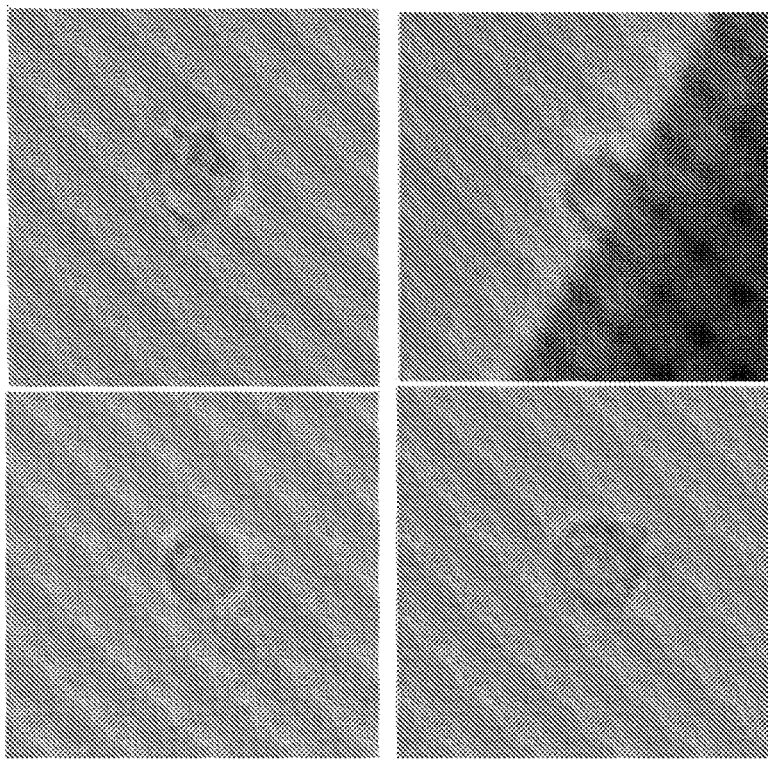
FIG. 17 illustrates examples of image problems and challenges including the cells being on the well edge, the images being out of focus, and the images being dark.

As an alternative to the image processing techniques described in the previous section, a deep-learning model may be used to predict cell morphology. The deep-learning model is advantageous as it is able to provide consistent results of a larger number of images relative to manual human review. It is better able to handle problems that may occur in images, including issues in image quality, such as darkness or blurriness. It is also better able to analyze images having challenges related to cell pattern inconsistencies and cells being close to the well edge due to plate centrifugation. FIG. 17 illustrates example images having these types of problems and challenges.

Images that are considered good from the cluster verification deep-learning model as including only one cell cluster continue on to morphology review. For the only one region of the querying image depicting a cell cluster, the method of CLD image characterization further includes processing the region with a morphology deep-learning model to determine 1) whether the cell cluster has exactly one or alternatively more than one cell within the cluster and simultaneously 2) whether, if only a single cell is present in the only one cell cluster, the morphology of the cell is acceptable (i.e., the cell has good morphology).

In certain embodiments, the output of the morphology deep-learning model is the categorization of a querying image into one of three categories with a respective level of confidence. The categories may be too dark for analysis, good image, and bad image. The model is trained by feeding in images with one of these three labels. The morphology deep-learning algorithm calculates the probability of these three categories for an input image and selects the category having the highest probability.

As earlier described, a pre-check of Day 0 images includes a determination of whether or not an image is too dark for further analysis. Using a low-pass filter during this initial pre-check stage of analysis, images that are quite dark, falling below a predetermined darkness threshold, are identified and filtered out already at some point prior to analysis by the morphology deep learning model. The morphology deep-learning model thus provides another layer of image darkness analysis. Dark images that pass the pre-check stage but are still dark and have additional issues, such as blurriness, may be not be suitable for further analysis. Such images, being both dark and out of focus, are identified and filtered out for containing a defect as the algorithm may not be able to correctly identify cell clusters in them or the presence of any cells within a cell cluster. Too dark for analysis may also be used as a categorical label to train towards as one of the deep learner's outputs to help ensure that only images that meet a basic brightness criterion continue on in the workflow.

An image is categorized as a good image by the morphology deep-learning model if there is both 1) a high probability that there is only a single cell identified in the only one cell cluster, and 2) there is a high probability that the single cell has good morphology. An image is categorized as a bad image if there is a high probability that not even a single cell is identified and that instead the cluster is not in fact a cell cluster but rather, for example, debris. An image is also categorized as a bad image by the morphology deep-learning model if there is a high probability that more than one cell is identified within/making up the only one cell cluster, or if there is a high probability that a single cell is identified within the cell cluster but that single cell has bad morphology.

The results of Day 0 image analysis using the cluster verification and morphology deep learners are then stored and/or transmitted by the computer or between computers for further analysis via manual human review. Manual human review may be performed using visual inspection and associated imager software so that the manual reviewer can make the final determination regarding which clones to proceed with in the single-cell cloning workflow. The selected clones are then robot-picked and seeded into a 96-well plate, or other sized plate, for culturing and further scaling up for that clone.

In an alternate embodiment, the output of the morphology deep-learning model is a categorization of a querying images into one of five categories with a respective level of confidence. The categories may be too dark for analysis, good image, good image with concerns, bad image, and bad image with merit. In such an embodiment, the model is trained by feeding in images with one of these five labels. The morphology deep-learning algorithm calculates the probability of these five categories for an input image and selects the category having the highest probability. Images categorized as too dark for analysis, bad images, and bad images with merit get filtered out and do not continue on for further analysis. Relative to the three-category embodiment discussed previously, including these additional middle layers gives a researcher options during hit-picking step. If there are not enough images categorized as good images by the morphology deep-learner to proceed to the next stage in the single-cell cloning workflow (i.e., combining with the analysis resulting from confluence imaging to identify clones to culture), the researcher may manually review the images categorized as good image with concerns and identify those that are in fact good images.

It is understood that the three categories or five categories described are exemplary only and that use of other labels and numbers of labels in the categorization of images is within the scope of the disclosure. For the following example dataset, the labels and associated output categories are more descriptive, relating to the detection of cells and the cell morphology.

Example Dataset

In one example image dataset, 309 plates each with 384 wells resulted in a total of 118,656 wells being available. Day 0 BF and FL images in a good variety of conditions were included. About 2% of the images, or over 4000, were manually labeled as belonging to one of six categories: good cell, good cell but not sure, bad cell or >1 cell, bad cell but not sure, nothing (or no cell), debris. These labels were provided to the algorithm to build a preliminary deep-learning model, which was then used to label the remaining 98% of the images.

Figure 18:
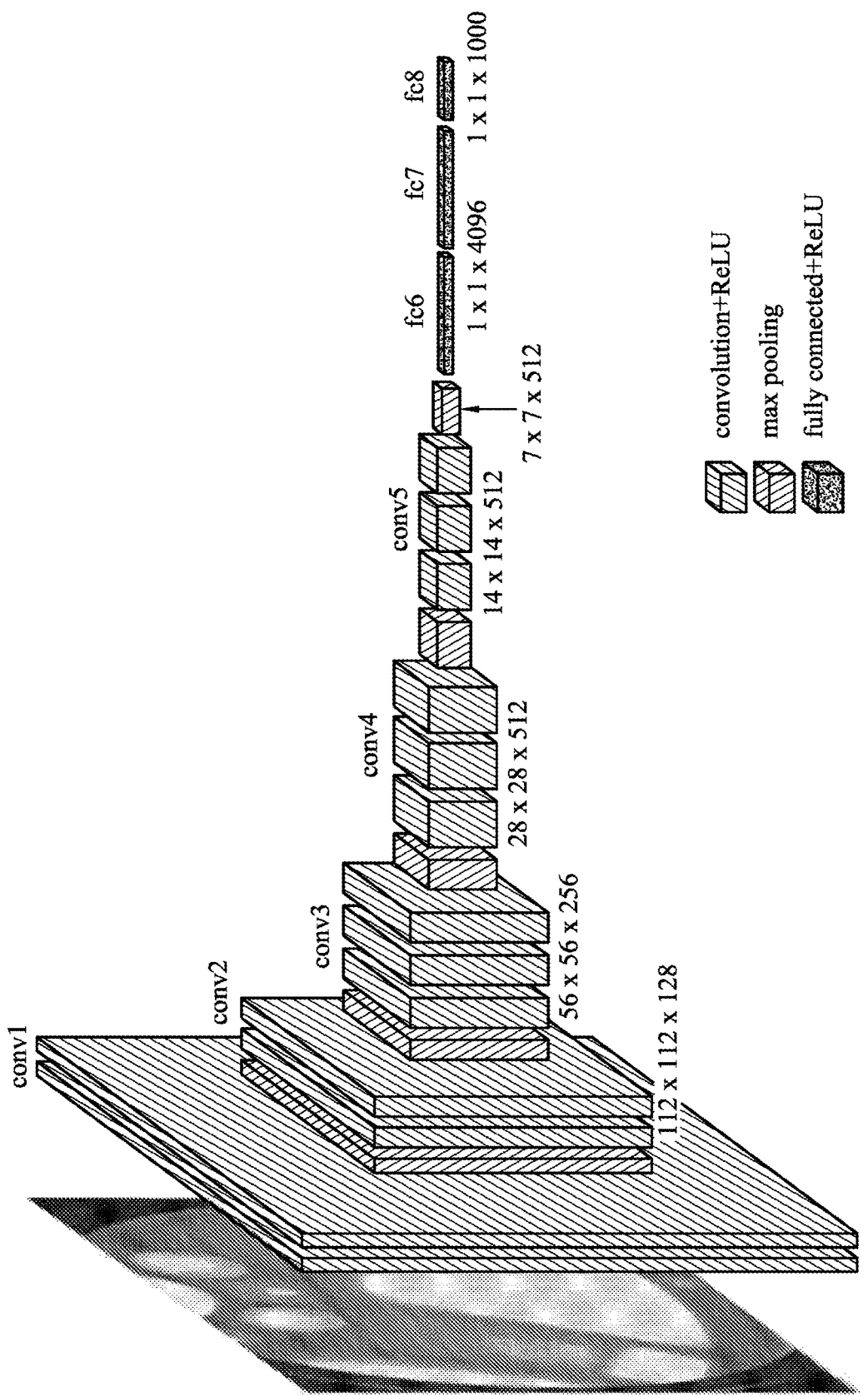
FIG. 18 illustrates an example morphology deep-learning model based on VGG16 architecture.

FIG. 18 illustrates an example deep-learning model based on VGG16 architecture that may be used for the morphology deep learning model, in accordance with one embodiment. In this example, there are thirteen convolution layers and three fully connected layers, however the model used may be built to have any number of layers. The input to cov1 layer is of fixed size 224×224 RGB image. The image is passed through a stack of convolutional (cony.) layers, where the filters are used with a very small receptive field: 3×3 (which is the smallest size to capture the notion of left/right, up/down, center). In one of the configurations, it also utilizes 1×1 convolution filters, which can be seen as a linear transformation of the input channels (followed by non-linearity). The convolution stride is fixed to 1 pixel; the spatial padding of conv. layer input is such that the spatial resolution is preserved after convolution, i.e. the padding is 1-pixel for 3×3 conv. layers. Spatial pooling is carried out by five max-pooling layers, which follow some of the conv. layers (not all the cony. layers are followed by max-pooling). Max-pooling is performed over a 2×2 pixel window, with stride 2. Three fully-connected (FC) layers follow a stack of convolutional layers: the first two have 4096 channels each, the third performs classification for 1000 classes and thus contains 1000 channels (one for each class). The final layer is the soft-max layer. The configuration of the fully connected layers is the same in all networks. All hidden layers are equipped with the rectification (ReLU) non-linearity. It is understood that other known CNN architectures may be retuned and used for the same purpose and are within the scope of this disclosure.

In one example embodiment of the example deep-learning model introduced above, 10,000 candidates were labeled in 6 levels: good cell, good cell but not sure, bad cell or >1 cell, bad cell but not sure, nothing (or no cell), debris. In cases where the morphology is deemed not sure by the model, a manual review of those images was performed. In addition to manual labeling, the image processing analysis results described for single cluster detection (i.e., find the contour of the cluster and blob detection) and cell morphology were also used to do the initial labeling. Both BF and FL images were read in grayscale, resized to 64*64*1 using the cv2.resize function, merged into one image having a size of 64*64*2 using the cv2.merge function, and used as input images of the deep learning model. Ten percent of the data was selected randomly as a validation set and the remaining 90% was selected as a training set.

Transfer learning and image augmentation are used to enhance the performance of the model. As earlier described, transfer learning refers to training a base, or auxiliary, CNN on an auxiliary dataset and task, thereby developing certain parameters, and later utilizing a target dataset and task to further refine those parameters. Transfer learning is performed on the same model architecture with ImageNet or other custom dataset. This procedure has been demonstrated to enable training a large CNN on a target dataset without over-fitting by using a significantly larger auxiliary dataset. Moreover, prior research has reported that model generalization ability is greatly increased by transfer learning (compared to random initialization) even in the case where the auxiliary and target datasets are very dissimilar.

For morphology review in the method of CLD characterization disclosed herein, a plurality of second target training samples is accessed, the second target training samples including a plurality of second target training images associated with sampling areas and a plurality of cell indications and a plurality of cell morphology indications associated with the plurality of second target training images, respectively. A plurality of second auxiliary training samples is selected based on the second target training samples, the second auxiliary training samples including a plurality of second auxiliary training images and a plurality of second content categories associated with the plurality of second auxiliary training images, respectively. The morphology deep-learning model is then trained by training a second auxiliary machine-learning model based on the plurality of second auxiliary training samples and training the morphology deep-learning model based on the trained second auxiliary machine-learning model, the plurality of cell indications, and the plurality of cell morphology indications. The plurality of second content categories associated with the plurality of second auxiliary training images do not match the plurality of cell indications and the plurality of cell morphology indications associated with the plurality of second target training images.

Figure 19:
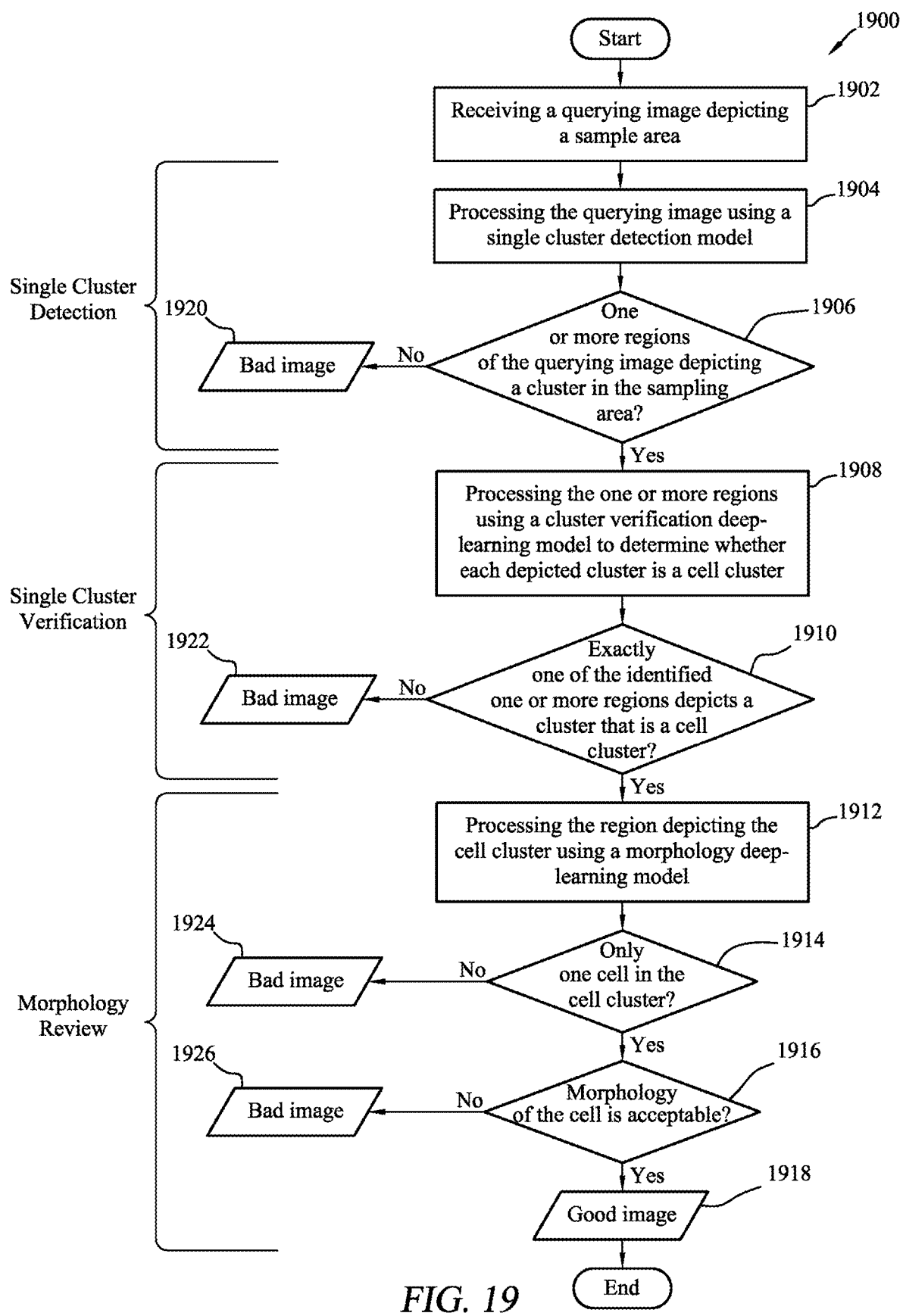
FIG. 19 illustrates a flowchart of an example method by a computing system for performing single cluster detection, single cluster verification, and morphology review.

FIG. 19 illustrates a flowchart of an example method by a computing system 1900 of performing single cluster detection, single cluster verification, and morphology review to ultimately identify a sampling area containing a single cell with acceptable morphology. The method 1900 includes receiving a querying image depicting a sampling area 1902. For single cluster detection, the querying image is processed using a single cluster detection model 1904 to identify one or more regions of the querying image depicting a cluster in the sampling area 1906. For single cluster verification, the method 1900 includes processing the one or more regions using a cluster verification deep-learning model to determine whether each depicted cluster is a cell cluster 1908 and determining that exactly one of the identified one or more regions depicts a cluster that is a cell cluster 1910. For morphology review, the region depicting the cell cluster is processed using a morphology deep-learning model 1912 to determine that there is only one cell in the cell cluster 1914 and to determine that the morphology of the cell is acceptable 1916. The querying image depicting the sampling area with a single cell having acceptable morphology is considered a good image 1918.

FIG. 19 also illustrates points in the method 1900 where an image may be filtered out as a bad image for containing a defect. For single cluster detection, if no clusters are identified by the single cluster detection model, the image is considered a bad image 1920. For single cluster verification, if it is determined by the cluster verification deep-learning model that no region or more than one of the identified one or more regions depicts a cluster that is a cell cluster, the image is considered a bad image 1922. For morphology review, if it is determined by the morphology deep-learning model that no cell or more than one cell is in the only one cell cluster, the image is considered a bad image 1924. If it is determined that there is only one cell in the cell cluster, but the morphology of the cell is determined to not be acceptable, the image is considered a bad image 1926.

FIG. 20A through FIG. 22 illustrate what the CNN sees as the image characterization tool is working.

Figure 20A:
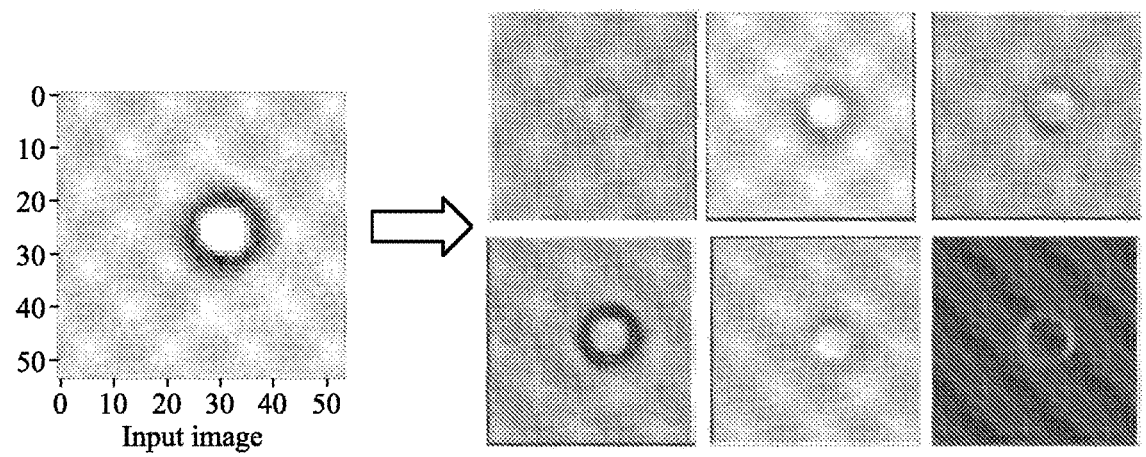
FIG. 20A illustrates an example visualizing filter pattern after a first convolution layer.
Figure 20B:
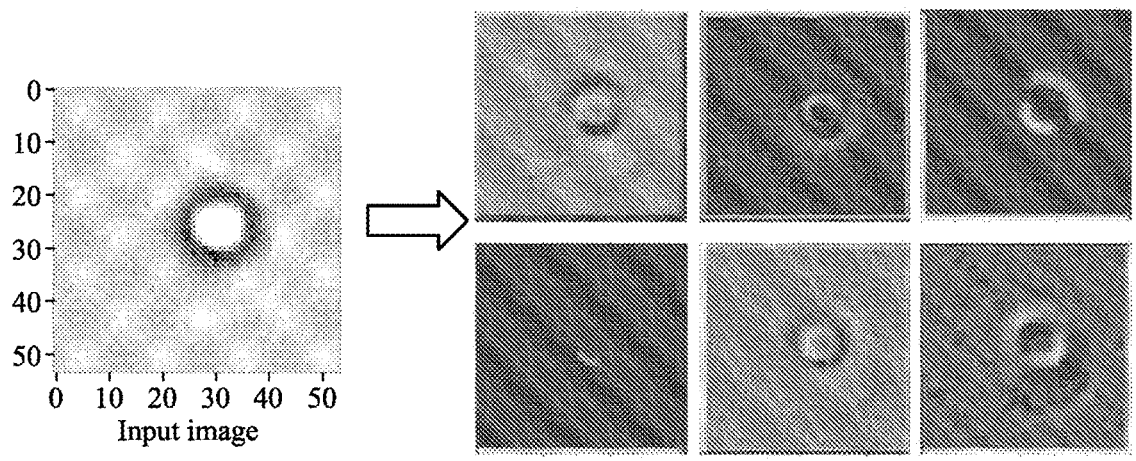
FIG. 20B illustrates an example visualizing filter pattern after a second convolution layer.
Figure 20C:
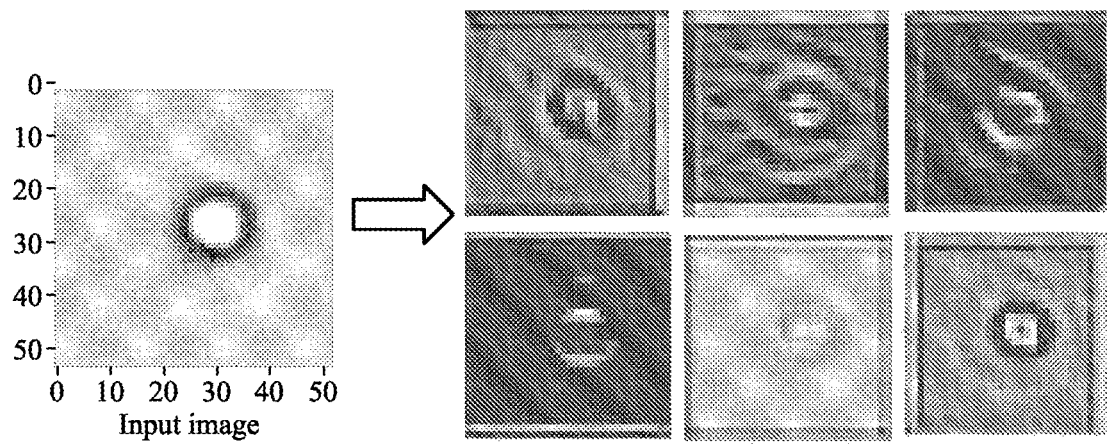
FIG. 20C illustrates an example visualizing filter pattern after a fourth convolution layer.

Visualizing intermediate activations. FIGS. 20A-20C show what an original input image will become after passing through each layer of filter. Some filters are very sensitive to the pattern of a cell, especially the ring shape valley of the cell membrane. In the following examples, the figures were built using a models.Model function of keras package. On the left of each figure is the original, raw input image, and on the right is the image after passing through the convolution filter, where the images were selected manually. The images on the right, as outputs of the filter for that image, trigger the morphology deep-learner algorithm to determine whether the image is good or bad. In one example, the bright center part of the cell provides as an interest point, so when the morphology deep-learner algorithm evaluates the image, it identifies the center part and evaluates it for roundness. This may be performed for one layer, with other layers looking at different aspects of the image. FIG. 20A illustrates example visualizing filter patterns after a first convolution layer. FIG. 20B illustrates example visualizing filter patterns after a second convolution layer. FIG. 20C illustrates example visualizing filter patterns after a fourth convolution layer.

Figure 21:
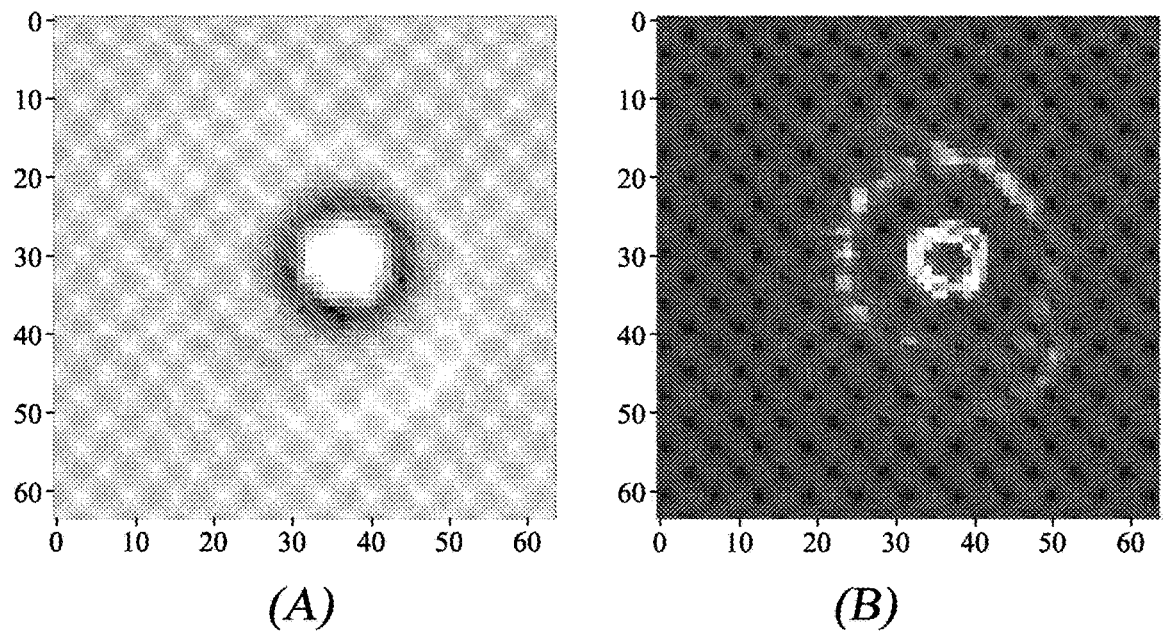
FIG. 21 illustrates an example output saliency map (B) for an input image (A).

Saliency visualizations. A saliency map shows which part of the image is important for the morphology deep-learning model to make its prediction. To build the saliency map in the following example, a visualize_saliency function from vis.visualization package was used with "guided" option. FIG. 21 illustrates an example saliency map, where the most important part of the image is the cell center, especially the area close to the cell membrane, and the ring shape area outside of the cell membrane. More specifically, on the left is the original, raw input image (A) showing a cell having good morphology. On the right is the input image after processing by the saliency function, represented as an example output saliency map (B) for the input image (A). In this example, the saliency map (B) shows the cell having a bright center and bright ring outside the membrane. As such, it is likely the cell will be predicted by the morphology deep-learning model as having good morphology.

Figure 22:
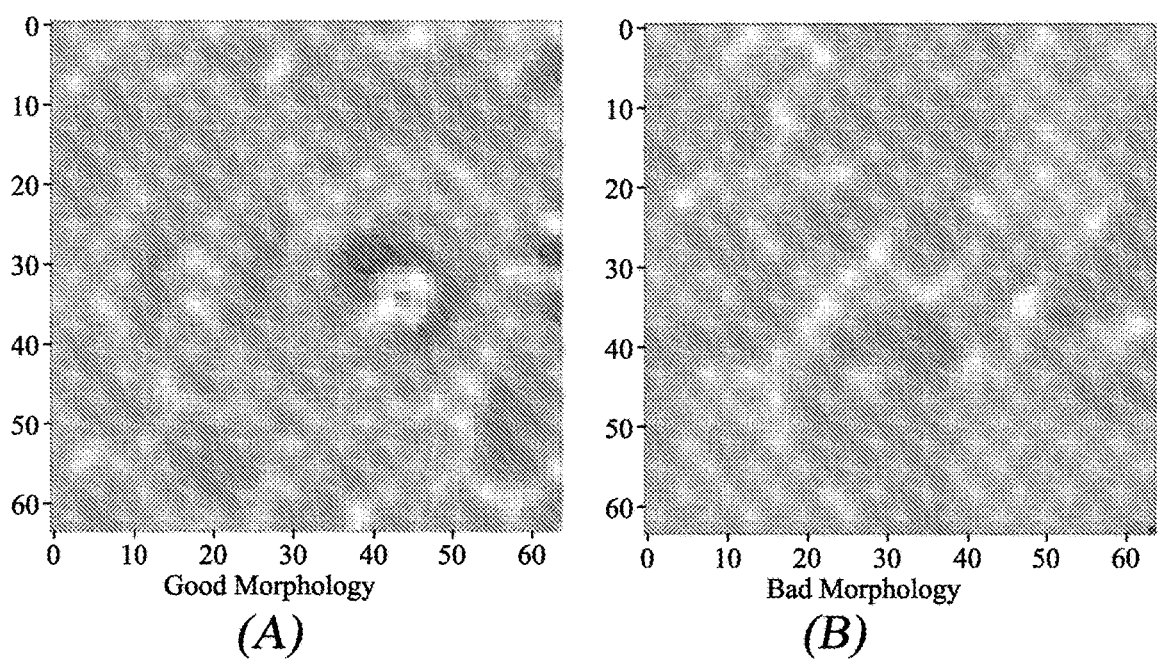
FIG. 22 illustrates an example activation maximization image of a cell having good morphology (A) and an example activation maximization image of a cell having bad morphology (B).

Activation maximization. Activation maximization builds or generates an input image that maximizes the filter output activation. In the following examples, a visualize_activation function from vis.visualization package was used to build activation maximization images. FIG. 22 illustrates example activation maximization images where the activation function has maximized the activation of the output node of a cell. The activation maximization image on the left is of a cell having good morphology (A). By maximizing certain neurons, some pattern of a good cell, such as the bright center and dark ring-shape area around it, may be detected in the middle right part of the image. The activation maximization image on the right is of a cell having bad morphology (B).

Cell Detection and Cell Morphology: CNN Prediction Performance

In the example embodiment of the morphology deep-learning model discussed above, approximately 12,000 boxed FL and BF images were labeled manually in six levels, with another approximately 8,000 boxed images randomly selected from the well image labeled as "nothing". The overall correct classification rate for the morphology model on validation data of approximately 2,000 is 87%, and that for detecting a cell (cell vs. non-cell) is 99.8%, and that for cell morphology in four levels is 89%.

TABLE 2

Confusion matrix of CNN prediction performance on validation data.

|  |  | Prediction | | | | | |
| --- | --- | --- | --- | --- | --- | --- | --- |
|  |  | nothing | debris | good cell | good cell but not sure | bad cell but not sure | bad cell or >1 cell |
| Truth | nothing | 751 | 0 | 0 | 0 | 0 | 0 |
|  | debris | 0 | 32 | 0 | 0 | 0 | 1 |
|  | good cell | 0 | 0 | 516 | 39 | 8 | 43 |
|  | good cell but not sure | 0 | 0 | 27 | 125 | 13 | 6 |
|  | bad cell but not sure | 0 | 1 | 6 | 17 | 13 | 17 |
|  | bad cell or >1 cell | 0 | 2 | 42 | 5 | 11 | 247 |

Figure 23A:
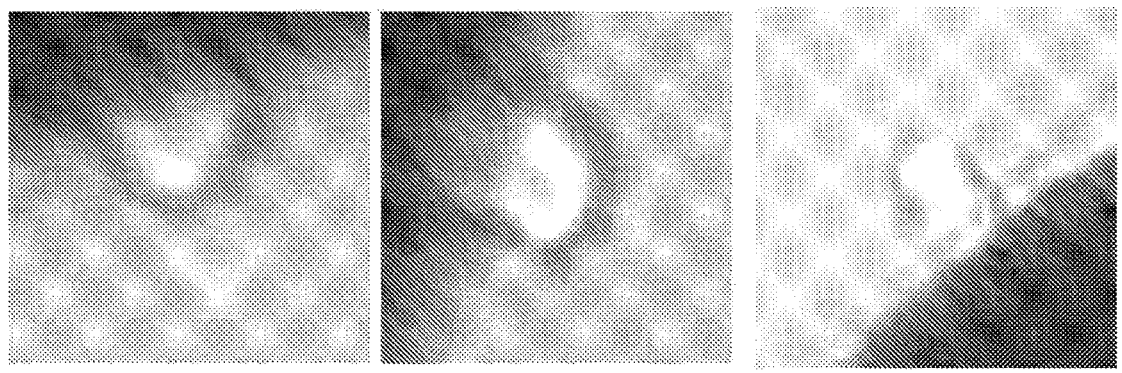
FIG. 23A illustrates examples of mistakes in prediction based on the cells being on the well edge.
Figure 23B:
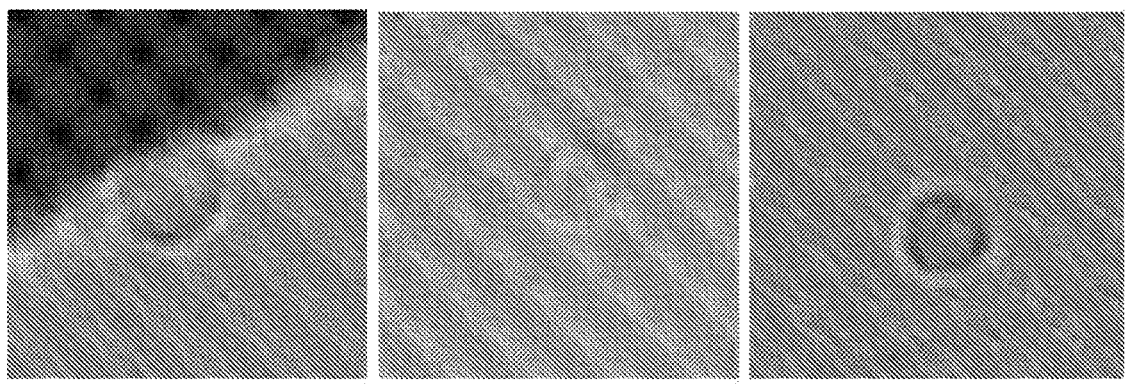
FIG. 23B illustrates examples of mistakes in prediction based on the images being dark.

While the correct classification rate is high for cell morphology, prediction mistakes may still be made based on certain challenges. FIG. 23A illustrates examples of mistakes in prediction based on the cells being on the well edge. FIG. 23B illustrates examples of mistakes in prediction based on the images being dark. By continuing to train the morphology deep-learning model to a more mature stage with additional data, it is expected that prediction performance will improve.

As earlier described, proper analysis of high-resolution Day 0 plate images is important in cell line development. Implementation of the method of CLD image characterization described herein, which utilizes deep-learning models, results in a more efficient workflow that allows for more qualified clones to be taken forward. It increases the consistency of single-cell image analysis, reduces time and labor for clone selection and manual review process, and confers extremely high assurance that the cell lines derived from this workflow are clonally-derived.

Systems and Methods

Figure 24:
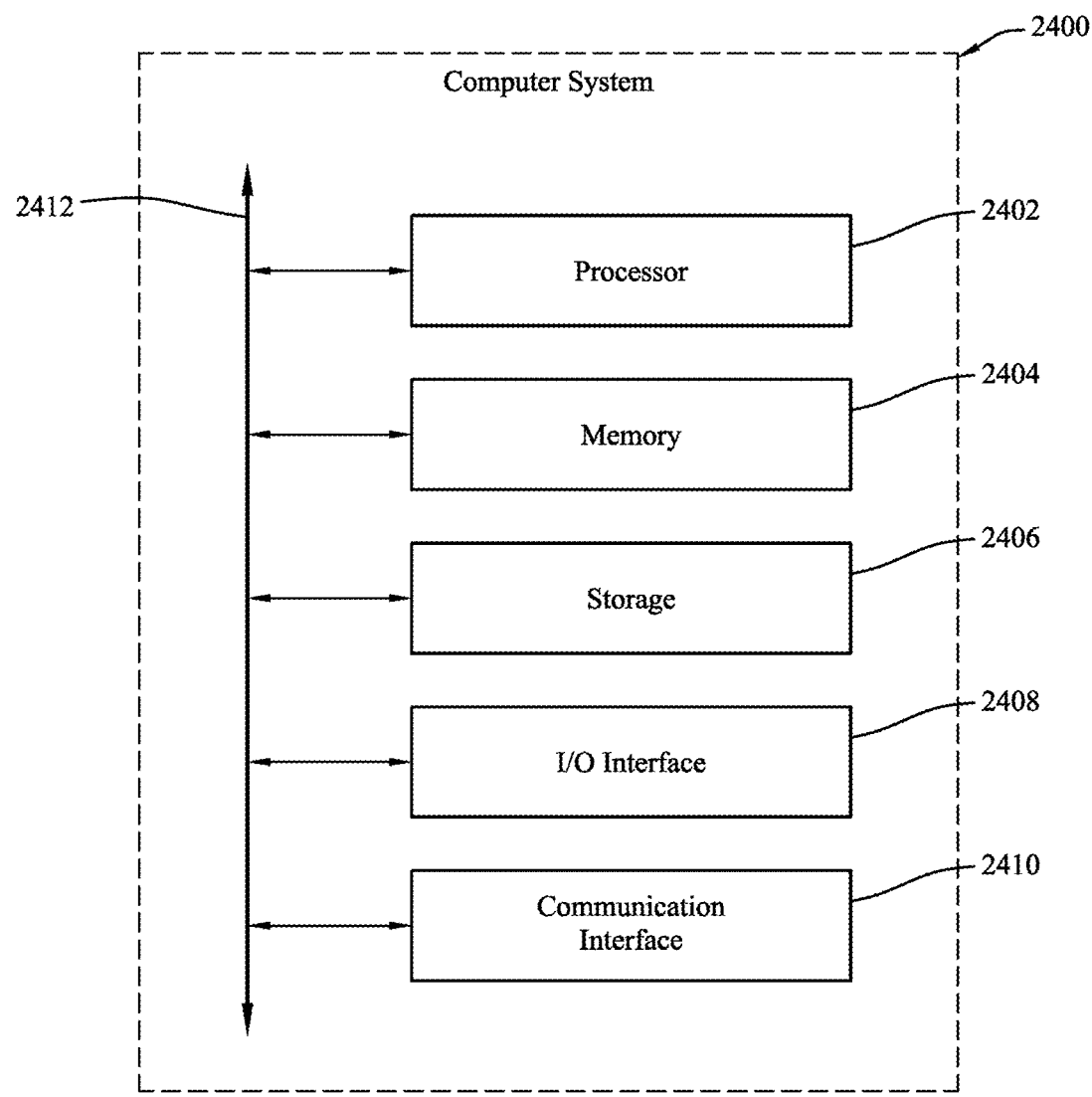
FIG. 24 illustrates an example of a computing system.

FIG. 24 illustrates an example computer system 2400. In particular embodiments, one or more computer systems 2400 perform one or more steps of one or more methods described or illustrated herein. In particular embodiments, one or more computer systems 2400 provide functionality described or illustrated herein. In particular embodiments, software running on one or more computer systems 2400 performs one or more steps of one or more methods described or illustrated herein or provides functionality described or illustrated herein. Particular embodiments include one or more portions of one or more computer systems 2400. Herein, reference to a computer system may encompass a computing device, and vice versa, where appropriate. Moreover, reference to a computer system may encompass one or more computer systems, where appropriate.

This disclosure contemplates any suitable number of computer systems 2400. This disclosure contemplates computer system 2400 taking any suitable physical form. As example and not by way of limitation, computer system 2400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 2400 may include one or more computer systems 2400; be unitary or distributed; span multiple locations; span multiple machines; span multiple data centers; or reside in a cloud, which may include one or more cloud components in one or more networks. Where appropriate, one or more computer systems 2400 may perform without substantial spatial or temporal limitation one or more steps of one or more methods described or illustrated herein. As an example and not by way of limitation, one or more computer systems 2400 may perform in real time or in batch mode one or more steps of one or more methods described or illustrated herein. One or more computer systems 2400 may perform at different times or at different locations one or more steps of one or more methods described or illustrated herein, where appropriate.

In particular embodiments, computer system 2400 includes a processor 2402, memory 2404, storage 2406, an input/output (I/O) interface 2408, a communication interface 2410, and a bus 2412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2402 includes hardware for executing instructions, such as those making up a computer program. As an example and not by way of limitation, to execute instructions, processor 2402 may retrieve (or fetch) the instructions from an internal register, an internal cache, memory 2404, or storage 2406; decode and execute them; and then write one or more results to an internal register, an internal cache, memory 2404, or storage 2406. In particular embodiments, processor 2402 may include one or more internal caches for data, instructions, or addresses. This disclosure contemplates processor 2402 including any suitable number of any suitable internal caches, where appropriate. As an example and not by way of limitation, processor 2402 may include one or more instruction caches, one or more data caches, and one or more translation lookaside buffers (TLBs). Instructions in the instruction caches may be copies of instructions in memory 2404 or storage 2406, and the instruction caches may speed up retrieval of those instructions by processor 2402. Data in the data caches may be copies of data in memory 2404 or storage 2406 for instructions executing at processor 2402 to operate on; the results of previous instructions executed at processor 2402 for access by subsequent instructions executing at processor 2402 or for writing to memory 2404 or storage 2406; or other suitable data. The data caches may speed up read or write operations by processor 2402. The TLBs may speed up virtual-address translation for processor 2402. In particular embodiments, processor 2402 may include one or more internal registers for data, instructions, or addresses. This disclosure contemplates processor 2402 including any suitable number of any suitable internal registers, where appropriate. Where appropriate, processor 2402 may include one or more arithmetic logic units (ALUs); be a multi-core processor; or include one or more processors 2402. Although this disclosure describes and illustrates a particular processor, this disclosure contemplates any suitable processor.

In particular embodiments, memory 2404 includes main memory for storing instructions for processor 2402 to execute or data for processor 2402 to operate on. As an example and not by way of limitation, computer system 2400 may load instructions from storage 2406 or another source (such as, for example, another computer system 2400) to memory 2404. Processor 2402 may then load the instructions from memory 2404 to an internal register or internal cache. To execute the instructions, processor 2402 may retrieve the instructions from the internal register or internal cache and decode them. During or after execution of the instructions, processor 2402 may write one or more results (which may be intermediate or final results) to the internal register or internal cache. Processor 2402 may then write one or more of those results to memory 2404. In particular embodiments, processor 2402 executes only instructions in one or more internal registers or internal caches or in memory 2404 (as opposed to storage 2406 or elsewhere) and operates only on data in one or more internal registers or internal caches or in memory 2404 (as opposed to storage 2406 or elsewhere). One or more memory buses (which may each include an address bus and a data bus) may couple processor 2402 to memory 2404. Bus 2412 may include one or more memory buses, as described below. In particular embodiments, one or more memory management units (MMUs) reside between processor 2402 and memory 2404 and facilitate accesses to memory 2404 requested by processor 2402. In particular embodiments, memory 2404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2404 may include one or more memories 2404, where appropriate. Although this disclosure describes and illustrates particular memory, this disclosure contemplates any suitable memory.

In particular embodiments, storage 2406 includes mass storage for data or instructions. As an example and not by way of limitation, storage 2406 may include a hard disk drive (HDD), a floppy disk drive, flash memory, an optical disc, a magneto-optical disc, magnetic tape, or a Universal Serial Bus (USB) drive or a combination of two or more of these. Storage 2406 may include removable or non-removable (or fixed) media, where appropriate. Storage 2406 may be internal or external to computer system 2400, where appropriate. In particular embodiments, storage 2406 is non-volatile, solid-state memory. In particular embodiments, storage 2406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2406 taking any suitable physical form. Storage 2406 may include one or more storage control units facilitating communication between processor 2402 and storage 2406, where appropriate. Where appropriate, storage 2406 may include one or more storages 2406. Although this disclosure describes and illustrates particular storage, this disclosure contemplates any suitable storage.

In particular embodiments, I/O interface 2408 includes hardware, software, or both, providing one or more interfaces for communication between computer system 2400 and one or more I/O devices. Computer system 2400 may include one or more of these I/O devices, where appropriate. One or more of these I/O devices may enable communication between a person and computer system 2400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2408 for them. Where appropriate, I/O interface 2408 may include one or more device or software drivers enabling processor 2402 to drive one or more of these I/O devices. I/O interface 2408 may include one or more I/O interfaces 2408, where appropriate. Although this disclosure describes and illustrates a particular I/O interface, this disclosure contemplates any suitable I/O interface.

In particular embodiments, communication interface 2410 includes hardware, software, or both providing one or more interfaces for communication (such as, for example, packet-based communication) between computer system 2400 and one or more other computer systems 2400 or one or more networks. As an example and not by way of limitation, communication interface 2410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2410 for it. As an example and not by way of limitation, computer system 2400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2400 may include any suitable communication interface 2410 for any of these networks, where appropriate. Communication interface 2410 may include one or more communication interfaces 2410, where appropriate. Although this disclosure describes and illustrates a particular communication interface, this disclosure contemplates any suitable communication interface.

In particular embodiments, bus 2412 includes hardware, software, or both coupling components of computer system 2400 to each other. As an example and not by way of limitation, bus 2412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2412 may include one or more buses 2412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives. SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving a querying image depicting a sampling area;
   processing the querying image using a single cluster detection model to identify one or more regions of the querying image depicting a cluster in the sampling area;
   processing the one or more regions using a cluster verification deep-learning model to determine that each depicted cluster is a cell cluster;
   determining that exactly one of the identified one or more regions depicts a cluster that is a cell cluster; and
   processing the region depicting the cell cluster using a morphology deep-learning model to
   determine that there is only one cell in the cell cluster; and
   determine that the morphology of the cell is acceptable.

2. The method of claim 1, wherein each depicted cluster comprises a cluster contour region having a cluster contour region size within a predefined range and at least a predefined number of points.

3. The method of claim 2, wherein identifying the region further comprises drawing a bounding box around the cluster contour region.

4. The method of claim 1, wherein determining that each depicted cluster is a cell cluster comprises verifying each depicted cluster in a corresponding position of another querying image depicting the sampling area.

5. The method of claim 1, wherein determining that each depicted cluster is a cell cluster comprises determining that each depicted cluster appears as a cluster positive for having a cell.

6. The method of claim 1, wherein determining whether each depicted cluster is a cell cluster comprises determining whether each depicted cluster does not appear as a cluster negative for having a cell.

7. The method of claim 1, wherein determining that there is only one cell in the cell cluster comprises evaluating the number of contours detected in the cell cluster.

8. The method of claim 1, wherein determining that the morphology of the cell is acceptable comprises identifying a cell center area and evaluating the cell center area for roundness.

9. The method of claim 1, wherein determining that the morphology of the cell is acceptable comprises:
   identifying a bright cell center area and a dark ring-shape cell membrane around the bright cell center area.

10. The method of claim 1, wherein determining that the morphology of the cell is acceptable comprises identifying a bright cell center area and a bright ring-shape area outside of the cell membrane.

11. The method of claim 1, wherein the querying image comprises a fluorescence image or a bright-field image.

12. The method of claim 1, further comprising:
    prior to processing the querying image, identifying one or more large distinct objects in the querying image using contour detection algorithms during a pre-check stage of analysis.

13. The method of claim 1, further comprising:
    prior to processing the querying image, determining that the querying image is below a predetermined darkness threshold during a pre-check stage of analysis.

14. The method of claim 1, further comprising:
prior to processing the querying image, determining that a critical clipping of the sampling area exists in the querying image.

15. The method of claim 14, wherein the sampling area is a well, the well having a well contour in the querying image defined by a plurality of well contour points and a well contour center.

16. The method of claim 15, wherein determining that a critical clipping of the sampling area exists comprises:
applying a fitting circle having a fitting circle center and a fitting circle radius to the well contour in the querying image.

17. The method of claim 16, wherein determining that a critical clipping of the sampling area exists further comprises:
calculating the fitting circle radius minus a distance of the fitting circle center to each of the plurality of well contour points to identify differences between the well contour and the fitting circle.

18. The method of claim 15, wherein determining that a critical clipping of the sampling area exists comprises:
calculating a distance from the well contour center to an image edge minus a well contour radius; and
determining that the distance is less than or equal to a predefined distance threshold.

19. The method of claim 15, wherein determining that a critical clipping of the sampling area exists comprises:
determining that consecutive well contour points lie in a single line and that the distance between two end points of the single line meets or exceeds a predefined distance threshold.

20. The method of claim 19, wherein determining that a critical clipping of the sampling area exists further comprises:
determining that the single line has a local curvature of zero.

21. A system comprising:
one or more processors; and
a non-transitory memory coupled to the processors comprising instructions executable by the processors, the processors operable when executing the instructions to:
receive a querying image depicting a sampling area;
process the querying image using a single cluster detection model to identify one or more regions of the querying image depicting a cluster in the sampling area;
process the one or more regions using a cluster verification deep-learning model to determine that each depicted cluster is a cell cluster;
determine that exactly one of the identified-one or more regions depicts a cluster that is a cell cluster; and
process the region depicting the cell cluster using a morphology deep-learning model to:
determine that there is only one cell in the cell cluster; and
determine that the morphology of the cell is acceptable.

22. One or more computer-readable non-transitory storage media embodying software that is operable when executed to:
receive a querying image depicting a sampling area;
process the querying image using a single cluster detection model to identify one or more regions of the querying image depicting a cluster in the sampling area;
process the one or more regions using a cluster verification deep-learning model to determine that each depicted cluster is a cell cluster;
determine that exactly one of the identified-one or more regions depicts a cluster that is a cell cluster; and
process the region depicting the cell cluster using a morphology deep-learning model to:
determine that there is only one cell in the cell cluster; and
determine that the morphology of the cell is acceptable.

* * * * *